United States Patent
Kohsaka et al.

(10) Patent No.: US 11,015,061 B2
(45) Date of Patent: May 25, 2021

(54) PHTHALOCYANINE-BASED COMPOUND AND USES OF SAME

(71) Applicant: YAMAMOTO CHEMICALS, INC., Yao (JP)

(72) Inventors: Akihiro Kohsaka, Yao (JP); Hiroyuki Sasaki, Yao (JP); Yojiro Kumagae, Yao (JP)

(73) Assignee: YAMAMOTO CHEMICALS, INC., Yao (JP)

( * ) Notice: Subject to any disclaimer, the term of this patent is extended or adjusted under 35 U.S.C. 154(b) by 0 days.

(21) Appl. No.: 16/603,167

(22) PCT Filed: Apr. 6, 2018

(86) PCT No.: PCT/JP2018/014746
§ 371 (c)(1),
(2) Date: Oct. 14, 2019

(87) PCT Pub. No.: WO2018/186489
PCT Pub. Date: Oct. 11, 2018

(65) Prior Publication Data
US 2020/0032066 A1    Jan. 30, 2020

(30) Foreign Application Priority Data

Apr. 7, 2017    (JP) .............................. JP2017-076479

(51) Int. Cl.
*C09B 47/12*    (2006.01)
*G02B 5/20*    (2006.01)
*G02B 5/22*    (2006.01)

(52) U.S. Cl.
CPC .............. *C09B 47/12* (2013.01); *G02B 5/208* (2013.01); *G02B 5/226* (2013.01)

(58) Field of Classification Search
CPC ......... C09B 47/04; C09B 47/12; G02B 5/208; G02B 5/226
See application file for complete search history.

(56) References Cited

U.S. PATENT DOCUMENTS

| 5,024,926 A | 6/1991 | Itoh et al. |
| 5,446,141 A | 8/1995 | Itoh et al. |

(Continued)

FOREIGN PATENT DOCUMENTS

| JP | 2-138382 A | 5/1990 |
| JP | 2-502099 A | 7/1990 |

(Continued)

OTHER PUBLICATIONS

International Search Report for PCT/JP2018/014746 (PCT/ISA/210) dated Jun. 26, 2018.

(Continued)

*Primary Examiner* — Bijan Ahvazi
(74) *Attorney, Agent, or Firm* — Birch, Stewart, Kolasch & Birch, LLP

(57) ABSTRACT

Provided are a novel phthalocyanine compound, which has strong absorption in a near-infrared range, extremely weak absorption in a visible range, and high durability, and exhibits excellent solubility in an organic solvent or a resin, a process for producing the phthalocyanine compound, an intermediate, and uses thereof.

(Continued)

The phthalocyanine compound is represented by General Formula (1),

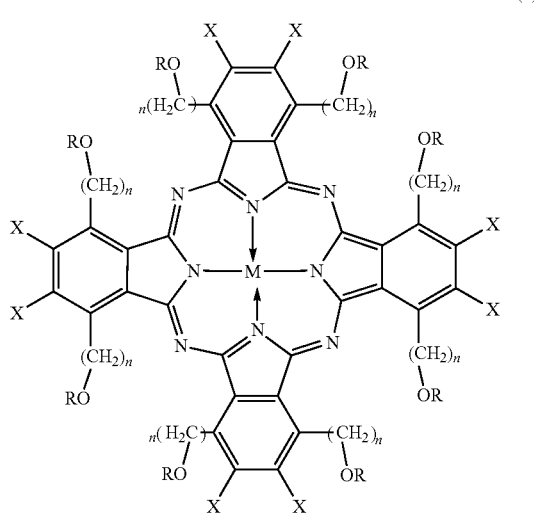

(1)

In which in Formula (1), R represents an alkyl group or an aryl group, X represents a hydrogen atom, a halogen atom, or an alkyl group, X's can form an aromatic ring by being bonded to each other, M represents two hydrogen atoms, a divalent metal, or a derivative of a trivalent or tetravalent metal, and n represents an integer of 3 to 6.

12 Claims, 8 Drawing Sheets

(56) References Cited

U.S. PATENT DOCUMENTS

| | | | |
|---|---|---|---|
| 5,506,708 | A | 4/1996 | Harrison et al. |
| 5,582,774 | A | 12/1996 | Itoh et al. |
| 5,618,929 | A * | 4/1997 | Harrison ............ C09K 19/3488 |
| | | | 540/139 |
| 2003/0234995 | A1* | 12/2003 | Masuda ............... C08K 5/0041 |
| | | | 359/885 |

FOREIGN PATENT DOCUMENTS

| | | |
|---|---|---|
| JP | 2002-226827 A | 8/2002 |
| JP | 2003-516421 A | 5/2003 |
| JP | 2009-144053 A | 7/2009 |
| JP | 2009-249565 A | 10/2009 |
| JP | 2013-218312 A | 10/2013 |
| JP | 2015-34260 A | 2/2015 |
| WO | WO 01/42368 A1 | 6/2001 |

OTHER PUBLICATIONS

Venkatram et al., "Femtosecond nonlinear optical properties of alkoxy phthalocyanines at 800 nm studied using Z-Scan technique", Chemical Physics Letters, vol. 464, No. 4-6, pp. 211-215, ISSN 0009-2614, (2008).
Written Opinion of the International Searching Authority for PCT/JP2018/014746 (PCT/ISA/237) dated Jun. 26, 2018.

* cited by examiner

PHTHALOCYANINE-BASED COMPOUND AND USES OF SAME

TECHNICAL FIELD

The present invention relates to a novel phthalocyanine-based compound, which exhibits excellent solubility in an organic solvent, is excellently compatible with a resin, exhibits excellent transparency to visible light, and has high durability, and uses of the phthalocyanine-based compound. Specifically, the present invention relates to a novel phthalocyanine-based compound, which has strong absorption in a near-infrared range, is hardly colored due to extremely weak absorption the compound has in a visible range, exhibits high durability against light or heat, exhibits excellent solubility in an organic solvent or a resin, and can be widely used in near-infrared absorbing materials such as a near-infrared absorbing filter, a security ink, a heat ray shielding film, an interlayer for laminated glass, and an infrared thermosensitive recording material, and uses of the phthalocyanine-based compound.

BACKGROUND ART

In recent years, a near-infrared absorbing material has been widely used in the field of an optical recording medium, a near-infrared photosensitizer, a photothermal conversion agent, a near-infrared cut-off filter, a near-infrared absorbing ink, a heat ray shielding material, and the like.

Particularly, for the uses such as a near-infrared cut-off filter used in a plasma display or the like, a transparent ink used for security, a heat ray shielding material used in windows of automobiles or buildings, and laser welding of plastics, there has been an increasing demand for the development of a near-infrared absorbing material which has a high ability to absorb near-infrared, has a high visible-light-transmittance which is in other words that the material is hardly colored and has high transparency, exhibits high durability against light or heat, and dissolves in an organic solvent or a resin.

As such a near-infrared absorbing material, various organic colorants have been examined, and an aminium compound, an immonium compound, a phthalocyanine compound, a naphthalocyanine compound, and the like have been partially put to practical use.

As the near-infrared absorbing material, a cyanine-based colorant (Patent Document 1), a diimmonium salt-based colorant (Patent Document 2), and a dithiol nickel complex (Patent Document 3) are used because these have a weak absorption in a visible range.

Although the cyanine-based colorant has a high ability to absorb near-infrared, durability of the colorant is low. Furthermore, unfortunately, the cyanine-based colorant dissolves only in polar solvents among organic solvents. The diimmonium salt-based colorant is poor in both the near-infrared absorbing ability and durability. Furthermore, unfortunately, the diimmonium salt-based colorant dissolves only in polar solvents among organic solvents. For the dithiol nickel complex, the same problems are pointed out, and the safety of the complex is an issue.

In view of high durability, phthalocyanine compounds are also under examination, and a phthalocyanine compound (Patent Document 4) inhibited from being associative in a resin has also been suggested. However, it is desired that this compound is improved in view of the compatibility with a resin.

Although phthalocyanine-based compounds (Patent Documents 5 and 6) similar to the present invention have also been suggested, these compounds are unsatisfactory in view of the visible light transmittance, the solubility in an organic solvent, and the compatibility with a resin and desired to be further improved.

RELATED DOCUMENT

Patent Document

[Patent Document 1] Japanese Unexamined Patent Application Publication No. 2015-34260

[Patent Document 2] Japanese Unexamined Patent Application Publication No. 2002-226827

[Patent Document 3] Japanese Unexamined Patent Application Publication No. 2009-144053

[Patent Document 4] Japanese Unexamined Patent Application Publication No. 2013-218312

[Patent Document 5] Japanese Unexamined Patent Application Publication No. 1990-138382

[Patent Document 6] Japanese Unexamined Patent Application Publication (Translation of PCT Application) No. 2003-516421

SUMMARY OF THE INVENTION

Technical Problem

An object of the present invention is to provide a novel phthalocyanine-based compound, which has strong absorption in a near-infrared range, extremely weak absorption in a visible range, and high durability, and exhibits excellent solubility in an organic solvent or a resin, and an infrared absorbing material containing the phthalocyanine-based compound.

Solution to Problem

Regarding the above object, the inventors of the present invention conducted intensive examinations. As a result, the inventors have found that a specific phthalocyanine-based compound satisfies the characteristics described above, and have accomplished the present invention. That is, the present invention relates to the following.

(i) A phthalocyanine-based compound represented by General Formula (1);

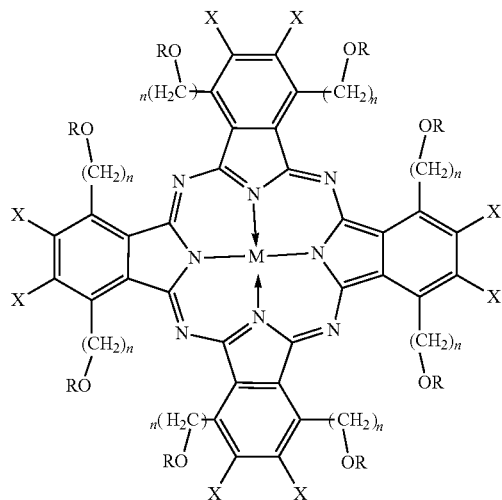

in which in Formula (1), R represents an alkyl group or an aryl group, X represents a hydrogen atom, a halogen atom, or an alkyl group, X's can form an aromatic ring by being bonded to each other, M represents two hydrogen atoms, a divalent metal, or a derivative of a trivalent or tetravalent metal, and n represents an integer of 3 to 6.

(ii) The phthalocyanine-based compound of (i) in which R represents a branched or linear alkyl group having 1 to 12 carbon atoms.

(iii) The phthalocyanine-based compound of (i) or (ii), in which M represents two hydrogen atoms, Pd, Cu, Zn, Pt, Ni, TiO, Co, Fe, Mn, Sn, Al—Cl, VO, or In.

(iv) The phthalocyanine-based compound of (i) to (iii), in which R represents a methyl group or an ethyl group, X represents a hydrogen atom, and n represents an integer of 4.

(v) A near-infrared absorbing material containing the phthalocyanine-based compound described in any one of (i) to (iv).

(vi) A heat ray shielding material containing the phthalocyanine-based compound described in any one of (i) to (iv).

(vii) The heat ray shielding material of (vi) that is a heat ray shielding film.

(viii) The heat ray shielding material of (vii) that is an interlayer for laminated glass.

Advantageous Effects of Invention

According to the present invention, it is possible to provide a phthalocyanine-based compound, which has strong absorption in a near-infrared range and, extremely weak absorption in a visible range, and high durability and exhibits excellent solubility in an organic solvent or a resin, and uses of the phthalocyanine-based compound such as a near-infrared absorbing material having the characteristics described above.

DESCRIPTION OF EMBODIMENTS

Figure 1:
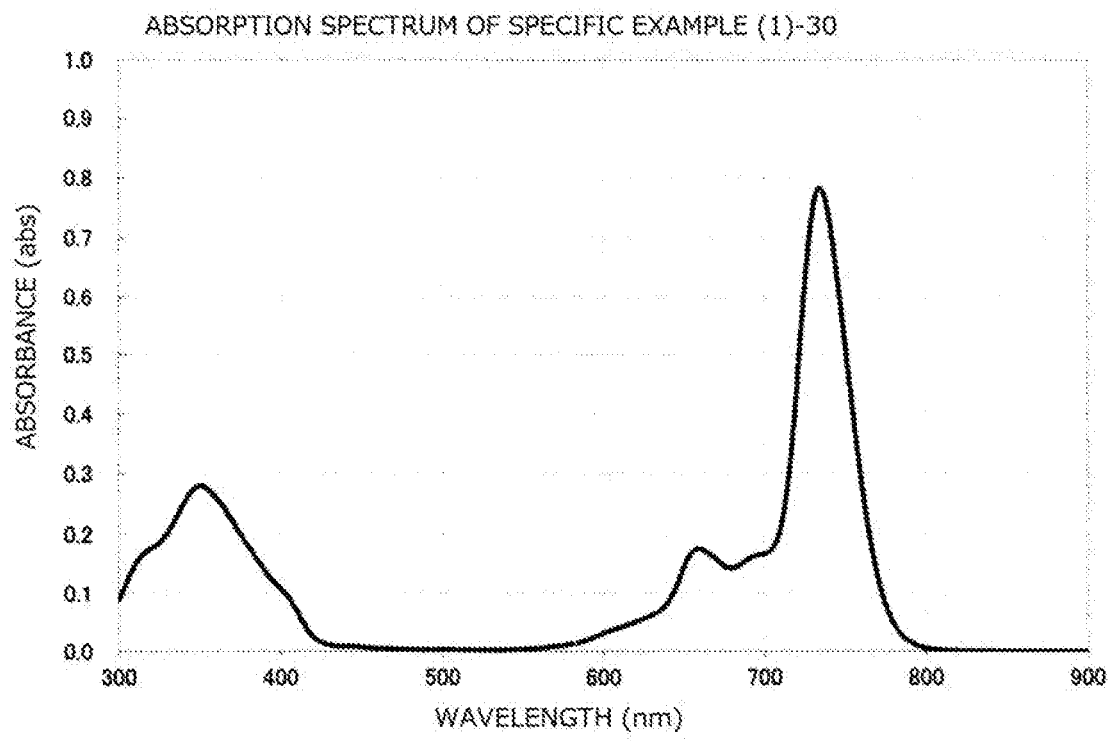
FIG. 1 is an absorption spectrum of a compound (1)-30 produced in Example 1.

Hereinafter, the present invention will be specifically described.

[Phthalocyanine-Based Compound]

A first invention of the present invention is a phthalocyanine-based compound represented by General Formula (1),

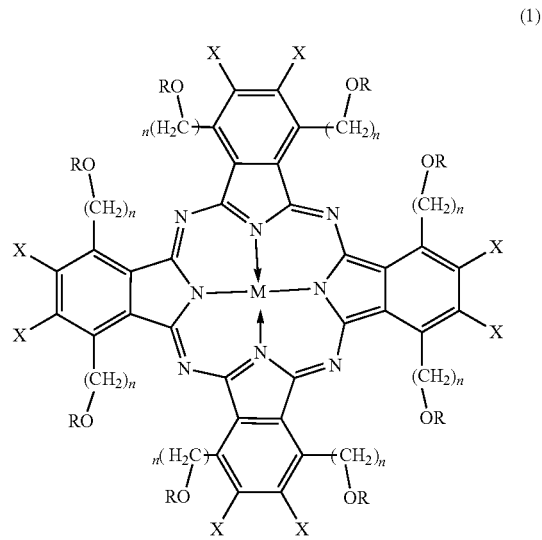

in which in Formula (1), R represents an alkyl group or an aryl group, X represents a hydrogen atom, a halogen atom, or an alkyl group, X's can form an aromatic ring by being bonded to each other, M represents two hydrogen atoms, a divalent metal, or a derivative of a trivalent or tetravalent metal, and n represents an integer of 3 to 6.

In General Formula (1), M preferably represents two hydrogen atoms, Pd, Cu, Zn, Pt, Ni, TiO, Co, Fe, Mn, Sn, Al—Cl, VO, or In, more preferably represents two hydrogen atoms, Pd, Cu, Zn, or VO, and most preferably represents Cu or VO.

As the alkyl group represented by R, an alkyl group having 1 to 12 carbon atoms is preferable, and an alkyl group having 1 to 8 carbon atoms is more preferable.

Examples of the alkyl group include linear, branched, or cyclic alkyl groups such as a methyl group, an ethyl group, a n-propyl group, an isopropyl group, a n-butyl group, an isobutyl group, a sec-butyl group, a tert-butyl group, a n-pentyl group, an isopentyl group, a neopentyl group, a tert-pentyl group, a 1,2-dimethylpropyl group, a 1-methylbutyl group, a 2-methylbutyl group, a n-hexyl group, a 1-methylpentyl group, a 2-methylpentyl group, a 4-methylpentyl group, a 4-methyl-2-pentyl group, a 1,2-dimethylbutyl group, a 2,3-dimethylbutyl group, a 3,3-dimethylbutyl group, a 1-ethylbutyl group, a 2-ethylbutyl group, a n-heptyl group, a 1-methylhexyl group, a 3-methylhexyl group, a 5-methylhexyl group, a 2,4-dimethylpentyl group, a cyclohexylmethyl group, a n-octyl group, a tert-octyl group, a 1-methylheptyl group, a 2-ethylhexyl group, a 2-propylpentyl group, a 2,5-dimethylhexyl group, a 2,5,5-trimethylhexyl group, a n-nonyl group, a 2,2-dimethylheptyl group, a 2,6-dimethyl-4-heptyl group, a 3,5,5-trimethylhexyl group, a n-decyl group, a 4-ethyloctyl group, a n-undecyl group, a 1-methyldecyl group, a n-dodecyl group, a 1,3,5,7-tetramethyloctyl group, a n-tridecyl group, a 1-hexylheptyl group, a n-tetradecyl group, a n-pentadecyl group, a n-hexadecyl group, a n-heptadecyl group, a n-octadecyl group, a n-eicosyl group, a n-tricosyl group, a n-tetracosyl group, a cyclopentyl group, a cyclohexyl group, a 4-methylcyclohexyl group, a 4-tert-butyl cyclohexyl group, a cycloheptyl group, and a cyclooctyl group.

Specific examples of alkyl groups having substituents include an alkyl group having an alkyloxy group or an alkenyloxy group such as a methoxymethyl group, an ethoxymethyl group, a n-butoxymethyl group, a n-hexyloxymethyl group, a (2-ethylbutyloxy)methyl group, or a 2-(4'-pentenyloxy)ethyl group, an alkyl group having an aralkyloxy group such as benzyloxymethyl group or a 2-(benzyloxymethoxy)ethyl group, an alkyl group having an aryloxy group such as a phenyloxymethyl group, a 4-chlorophenyloxymethyl group, or a 4-(2'-phenyloxyethoxy)butyl group, an alkyl group having a thioalkyl group such as a n-butylthiomethyl group or a 2-n-octylthioethyl group, and an alkyl group having a halogen atom such as a fluoromethyl group, a trifluoromethyl group, a perfluoroethyl group, a 4-fluorocyclohexyl group, a dichloromethyl group, a 4-chlorocyclohexyl group, or a 7-chloroheptyl group.

As the aryl group represented by R, a phenyl group, a naphthyl group, or a pyridyl group is preferable, and a substituted phenyl group is particularly preferable.

Examples of the aryl group include substituted or unsubstituted aryl groups such as a phenyl group, a 2-methylphenyl group, a 3-methylphenyl group, a 4-methylphenyl group, a 3-ethylphenyl group, a 4-ethylphenyl group, a 4-n-propylphenyl group, a 4-isopropylphenyl group, a 4-n-butylphenyl group, a 4-isobutylphenyl group, a 4-tert-butylphenyl group, a 4-n-pentylphenyl group, a 4-isopentylphenyl group, a tert-pentylphenyl group, a 4-n-hexylphenyl group, a 4-cyclohexylphenyl group, a 4-n-heptylphenyl group, a 4-n-octylphenyl group, a 4-n-nonylphenyl group, a 4-n-decylphenyl group, a 4-n-undecylphenyl group, a 4-n-dodecylphenyl group, a 4-n-tetradecylphenyl group, a 4-n-hexadecylphenyl group, a 4-n-octadecylphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 3,4,5-trimethylphenyl group, a 2,3,5,6-tetramethylphenyl group, a 5-indanyl group, a 1,2,3,4-tetrahydro-5-naphthyl group, a 1,2,3,4-tetrahydro-6-naphthyl group, a 2-methoxyphenyl group, a 3-methoxyphenyl group, a 4-methoxyphenyl group, a 3-ethoxyphenyl group, a 4-ethoxyphenyl group, a 4-n-propoxyphenyl group, a 4-isopropoxyphenyl group, a 4-n-butoxyphenyl group, a 4-isobutoxyphenyl group, a 4-n-pentyloxyphenyl group, a 4-n-hexyloxyphenyl group, a 4-cyclohexyloxyphenyl group, a 4-n-heptyloxyphenyl group, a 4-n-octyloxyphenyl group, a 4-n-nonyloxyphenyl group, a 4-n-decyloxyphenyl group, a 4-n-undecyloxyphenyl group, a 4-n-dodecyloxyphenyl group, a 4-n-tetradecyloxyphenyl group, a 4-n-hexadecyloxyphenyl group, a 4-n-octadecyloxyphenyl group, a 2,3-dimethoxyphenyl group, a 2,4-dimethoxyphenyl group, a 2,5-dimethoxyphenyl group, a 3,4-dimethoxyphenyl group, a 3,5-dimethoxyphenyl group, a 3,5-diethoxyphenyl group, a 2-methoxy-4-methylphenyl group, a 2-methoxy-5-methylphenyl group, a 3-methoxy-4-methylphenyl group, a 2-methyl-4-methoxyphenyl group, a 3-methyl-4-methoxyphenyl group, a 3-methyl-5-methoxyphenyl group, a 2-fluorophenyl group, a 3-fluorophenyl group, a 4-fluorophenyl group, a 2-chlorophenyl group, a 3-chlorophenyl group, a 4-chlorophenyl group, a 4-bromophenyl group, a 4-trifluoromethylphenyl group, a 3-trifluoromethylphenyl group, a 2,4-difluorophenyl group, a 3,5-difluorophenyl group, a 2,4-dichlorophenyl group, a 3,4-dichlorophenyl group, a 3,5-dichlorophenyl group, a 2-methyl-4-chlorophenyl group, a 2-chloro-4-methylphenyl group, a 3-chloro-4-methylphenyl group, a 2-chloro-4-methoxyphenyl group, a 3-methoxy-4-fluorophenyl group, a 3-methoxy-4-chlorophenyl group, a 3-fluoro-4-methoxyphenyl group, a 4-phenylphenyl group, a 3-phenylphenyl group, a 2-phenylphenyl group, a 4-(4'-methylphenyl)phenyl group, a 4-(4'-methoxyphenyl)phenyl group, a 3,5-diphenylphenyl group, a 1-naphthyl group, a 2-naphthyl group, a 4-methyl-1-naphthyl group, a 4-ethoxy-1-naphthyl group, a 6-n-butyl-2-naphthyl group, a 6-methoxy-2-naphthyl group, a 7-ethoxy-2-naphthyl group, a 2-furyl group, a 2-thienyl group, a 3-thienyl group, a 2-pyridyl group, a 3-pyridyl group, a 4-pyridyl group, a 4-(N,N-dimethylamino)phenyl group, a 3-(N,N-dimethylamino)phenyl group, a 2-(N,N-dimethylamino)phenyl group, a 4-(N,N-diethylamino)phenyl group, a 2-(N,N-diethylamino)phenyl group, a 4-(N,N-di-n-butylamino)phenyl group, a 4-(N,N-di-n-hexylamino)phenyl group, a 4-(N-cyclohexyl-N-methylamino)phenyl group, a 4-(N,N-diethylamino)-1-naphthyl group, a 4-pyrrolidinophenyl group, a 4-piperidinophenyl group, a 4-morpholinophenyl group, a 4-pyrrolidino-1-naphthyl group, a 4-(N-benzyl-N-methylamino)phenyl group, a 4-(N-benzyl-N-phenylamino)phenyl group, a 4-(N-methyl-N-phenylamino)phenyl group, a 4-(N-ethyl-N-phenylamino)phenyl group, a 4-(N-n-butyl-N-phenylamino)phenyl group, a 4-(N,N-diphenylamino)phenyl group, a 2-(N,N-diphenylamino)phenyl group, a 4-[N,N-di(4'-methylphenyl)amino]phenyl group, a 4-[N,N-di(3'-methylphenyl)amino]phenyl group, a 4-[N,N-di(4'-ethylphenyl)amino]phenyl group, a 4-[N,N-di(4'-tert-butylphenyl)amino]phenyl group, a 4-[N,N-di(4'-n-hexylphenyl)amino]phenyl group, a 4-[N,N-di(4'-methoxyphenyl)amino]phenyl group, a 4-[N,N-di(4'- ethoxyphenyl)amino]phenyl group, a 4-[N,N-di(4'-n-butoxyphenyl)amino]phenyl group, a 4-[N,N-di(4'-n-hexyloxyphenyl)amino]phenyl group, a 4-[N,N-di(1'-naphthyl)amino]phenyl group, a 4-[N,N-di(2'-naphthyl)amino]phenyl group, a 4-[N-phenyl-N-(3'-methylphenyl)amino]phenyl group, a 4-[N-phenyl-N-(4'-methylphenyl)amino]phenyl group, a 4-[N-phenyl-N-(4'-octylphenyl)amino]phenyl group, a 4-[N-phenyl-N-(4'-methoxyphenyl)amino]phenyl group, a 4-[N-phenyl-N-(4'-ethoxyphenyl)amino]phenyl group, a 4-[N-phenyl-N-(4'-n-hexyloxyphenyl)amino]phenyl group, a 4-[N-phenyl-N-(4'-fluorophenyl)amino]phenyl group, a 4-[N-phenyl-N-(1'-naphthyl)amino]phenyl group, a 4-[N-phenyl-N-(2'-naphthyl)amino]phenyl group, a 4-[N-phenyl-N-(4'-phenylphenyl)amino]phenyl group, a 4-(N,N-diphenylamino)-1-naphthyl group, a 6-(N,N-diphenylamino)-2-naphthyl group, a 4-(N-carbazolyl)phenyl group, and a 4-(N-phenoxazyl)phenyl group.

In a case where X represents an alkyl group, the alkyl group has the same definition as R in General Formula (1), and examples thereof are also the same.

Examples of the halogen atom represented by X include a chlorine atom, a fluorine atom, a bromine atom, and an iodine atom. Among these, a chlorine atom and a fluorine atom are preferable, and a fluorine atom is more preferable.

n is preferably 4 to 6, and particularly preferably 4.

Specific examples of the phthalocyanine-based compound represented by General Formula (1) will be shown below, but the present invention is not limited thereto.

TABLE 1

| SPECIFIC EXAMPLES | M | R | X | n |
|---|---|---|---|---|
| (1)-1 | H2 | $C_2H_5$— | H | 3 |
| (1)-2 | Pd | iso-$C_3H_7$— | H | 3 |
| (1)-3 | VO | $CH_3$— | H | 3 |
| (1)-4 | Zn | n-$C_4H_9$— | H | 3 |
| (1)-5 | Pt | n-$C_3H_7$— | H | 3 |
| (1)-6 | Ni | t-$C_4H_9$— | H | 3 |
| (1)-7 | TiO | $C_5H_{11}$— | H | 3 |
| (1)-8 | Co | n-$C_8H_{17}$— | H | 3 |
| (1)-9 | Fe | $(C_2H_5)CH_3CH$— | H | 3 |
| (1)-10 | Mn | $(CH_3)_2CHCH_2CH_2$— | H | 3 |
| (1)-11 | Sn | n-$C_7H_{15}$— | H | 3 |
| (1)-12 | Al—Cl | n-$C_6H_{13}$— | H | 3 |
| (1)-13 | Cu | 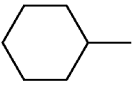 | H | 3 |
| (1)-14 | In | 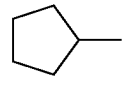 | H | 3 |
| (1)-15 | VO | $C_2H_5$— | H | 3 |
| (1)-16 | Pt | $CH_3$— | F | 3 |
| (1)-17 | Ni | 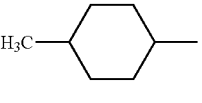 | F | 3 |
| (1)-18 | TiO | $(CH_3)_2CH_2CH_2$— | F | 3 |
| (1)-19 | Co | $C_3H_7(CH_3)CH_2$— | F | 3 |
| (1)-20 | Fe | $CH_3(CH_2)_2(C_2H_5)CH$— | F | 3 |
| (1)-21 | H2 | $CH_3$— | $CH_3$— | 3 |
| (1)-22 | Pd | $C_2H_5$— | $CH_3$— | 3 |
| (1)-23 | VO | $(CH_3)_3CCH_2CH_2$— | $CH_3$— | 3 |
| (1)-24 | Zn | 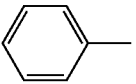 | $CH_3$— | 3 |
| (1)-25 | Pt | 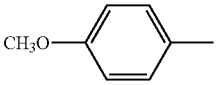 | $CH_3$— | 3 |
| (1)-26 | TiO | 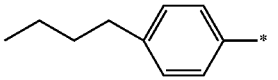 [SMILES: *c1ccc(CCCC)cc1] | H | 4 |
| (1)-27 | Cu | $(CH_3)_2CH_2CH_2$— | $C_2H_5$— | 4 |
| (1)-28 | In | $CH_3$— | n-$C_4H_9$— | 4 |
| (1)-29 | VO | $CH_3$— | n-$C_8H_{17}$— | 4 |
| (1)-30 | VO | $CH_3$— | H | 4 |
| (1)-31 | Cu | $CH_3$— | H | 4 |
| (1)-32 | Zn | $C_2H_5$— | H | 4 |
| (1)-33 | VO | $C_2H_5$— | H | 4 |
| (1)-34 | Ni | $C_3H_7(C_2H_5)CH_2$— | Cl | 4 |
| (1)-35 | TiO | $C_4H_9(C_3H_7)CH_2$— | Cl | 4 |
| (1)-36 | Co | $C_5H_{11}(CH_3)CH_2$— | Cl | 4 |
| (1)-37 | VO | 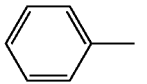 | H | 4 |
| (1)-38 | VO | 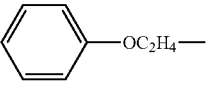 | H | 4 |
| (1)-39 | VO | 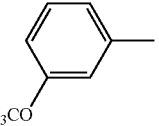 | H | 4 |
| (1)-40 | Cu | 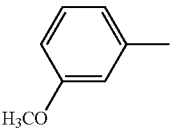 | H | 4 |
| (1)-41 | Pt | $CH_3$— | H | 4 |
| (1)-42 | VO | 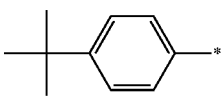 [SMILES: *c1ccc(C(C)(C)C)cc1] | H | 4 |
| (1)-43 | VO | 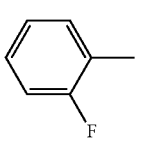 | H | 4 |
| (1)-44 | VO | 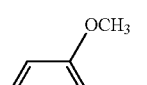 | H | 4 |
| (1)-45 | Cu | 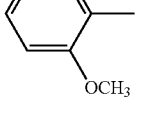 | H | 4 |

TABLE 1-continued

| SPECIFIC EXAMPLES | M | R | X | n |
|---|---|---|---|---|
| (1)-46 | TiO | C$_2$H$_5$— | H | 4 |
| (1)-47 | Cu | 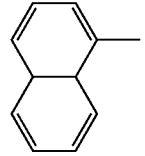 | H | 4 |
| (1)-48 | In | tert-C$_4$H$_9$— | H | 4 |
| (1)-49 | VO | CH$_3$(CH$_3$)$_2$CCH$_2$CH$_2$— | H | 4 |
| (1)-50 | H2 | C$_2$H$_5$(CH$_3$)CHCH$_2$— | H | 4 |
| (1)-51 | Pd | 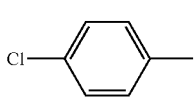 | H | 4 |
| (1)-52 | VO | 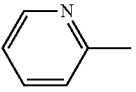 | H | 4 |
| (1)-53 | Zn | n-C$_4$H$_9$— | H | 4 |
| (1)-54 | Pt | tert-C$_5$H$_{11}$— | H | 4 |
| (1)-55 | Ni | CH$_3$— | CH$_3$— | 4 |
| (1)-56 | TiO | C$_2$H$_5$— | n-C$_8$H$_{17}$— | 4 |
| (1)-57 | Co | C$_2$H$_5$CH$_2$(CH$_3$)CHCH$_2$— | C$_2$H$_5$— | 4 |
| (1)-58 | Co | C$_4$H$_9$(C$_2$H$_5$)CHCH$_2$— | Cl | 4 |
| (1)-59 | Fe |  | Cl | 4 |
| (1)-60 | Mn | C$_{11}$H$_{23}$— | Cl | 5 |
| (1)-61 | VO | C$_{33}$H$_{67}$— | F | 5 |
| (1)-62 | Zn | 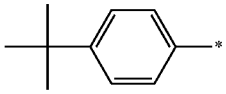 | F | 5 |
| (1)-63 | Pt | 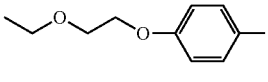 | F | 5 |
| (1)-64 | TiO | 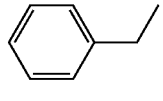 | F | 5 |
| (1)-65 | H2 | (CH$_3$)$_2$CHCH$_2$CH$_2$— | F | 5 |
| (1)-66 | Pd | iso-C$_3$H$_7$— | Br | 5 |
| (1)-67 | VO | tert-C$_4$H$_9$— | Br | 5 |
| (1)-68 | Zn | n-C$_7$H$_{15}$— | Br | 5 |
| (1)-69 | Pt | 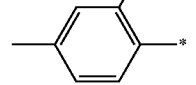 | Br | 5 |
| (1)-70 | Mn | C$_{11}$H$_{23}$— | Br | 5 |
| (1)-71 | H2 | 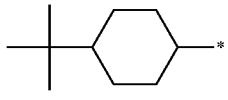 [SMILES: *C1CCC(C(C)(C)C)CC1] | H | 5 |
| (1)-72 | Pd | n-C$_8$H$_{17}$— | H | 5 |
| (1)-73 | VO | iso-C$_3$H$_7$— | F | 5 |
| (1)-74 | Zn | C$_2$H$_5$(CH$_3$)CH— | F | 5 |
| (1)-75 | Pt | 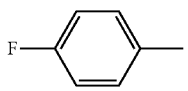 | F | 5 |
| (1)-76 | Ni | (CH$_3$)$_2$CHCH$_2$CH$_2$— | F | 5 |
| (1)-77 | TiO | n-C6H13— | F | 5 |
| (1)-78 | Co | (CH$_3$)$_2$CHCH$_2$CH$_2$CH$_2$— | H | 5 |
| (1)-79 | Pt | n-C$_9$H$_{19}$— | H | 5 |
| (1)-80 | H2 | CH$_3$— | H | 5 |
| (1)-81 | Pd | C$_2$H$_5$— | H | 5 |
| (1)-82 | VO | C$_3$H$_7$— | H | 5 |
| (1)-83 | Zn | iso-C$_3$H$_7$— | H | 5 |
| (1)-84 | Pt | n-C$_4$H$_9$— | H | 5 |
| (1)-85 | Ni | (CH$_3$)$_2$CHCH$_2$— | H | 6 |
| (1)-86 | TiO | tert-C$_4$H$_9$— | H | 6 |
| (1)-87 | Co | n-C$_5$H$_{11}$— | H | 6 |
| (1)-88 | Fe | (CH$_3$)$_3$CCH$_2$CH$_2$— | H | 6 |
| (1)-89 | Mn | n-C$_6$H$_{13}$— | H | 6 |
| (1)-90 | SnCl$_2$ | (CH$_3$)$_2$CHCH$_2$CH$_2$CH$_2$— | H | 6 |
| (1)-91 | Al—Cl | n-C$_7$H$_{15}$— | H | 6 |
| (1)-92 | Cu | n-C$_8$H$_{17}$— | H | 6 |
| (1)-93 | Ni | 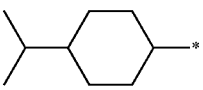 | H | 6 |
| (1)-94 | TiO | 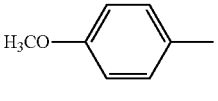 | H | 6 |
| (1)-95 | Co | 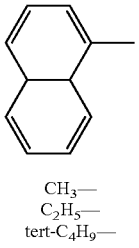 | H | 6 |
| (1)-96 | Pt | CH$_3$— | CH$_3$— | 6 |
| (1)-97 | Ni | C$_2$H$_5$— | CH$_3$— | 6 |
| (1)-98 | TiO | tert-C$_4$H$_9$— | CH$_3$— | 6 |
| (1)-99 | Co | 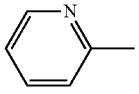 | CH$_3$— | 6 |
| (1)-100 | Fe | n-C$_8$H$_{17}$— | CH$_3$— | 6 |
| (1)-101 | Mn | CH$_3$— | F— | 6 |
| (1)-102 | Sn | C$_2$H$_5$— | F— | 6 |
| (1)-103 | Al—Cl | n-C$_5$H$_{11}$— | F— | 6 |
| (1)-104 | Cu | CH$_3$— | Cl— | 6 |
| (1)-105 | In | C$_2$H$_5$— | Cl— | 6 |
| (1)-106 | H2 | tert-C$_4$H$_9$— | Cl— | 6 |
| (1)-107 | Pd | CH$_3$ | Br— | 6 |
| (1)-108 | VO | (CH$_3$)$_2$CHCH$_2$— | Br— | 6 |
| (1)-109 | Zn | 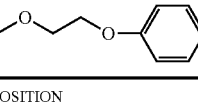 | Br— | 6 |

\* REPRESENTS A BONDING POSITION

The phthalocyanine-based compound represented by General Formula (1) can be produced with reference to known methods. That is, by causing a reaction between a metal or a metal derivative and at least one kind of compound selected from a phthalonitrile-based compound represented by General Formula (2) and a 1,3-diiminoisoindoline-based compound represented by General Formula (3), the phthalocyanine-based compound represented by General Formula (1) can be produced.

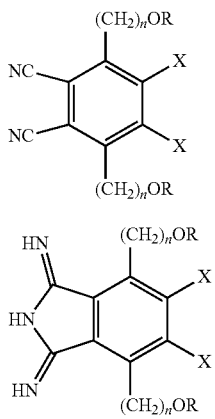

(2)

(3)

In General Formulae (2) and (3), R, X, and n have the same definition as R, X, and n in General Formula (1).

Examples of the metal or the metal derivative include Al, Si, Ti, V, Mn, Fe, Co, Ni, Cu, Zn, Ge, Ru, Rh, Pd, In, Sn, Pt, Pb, a halide, a carboxylate, a sulfate, a nitrate, a carbonyl compound, an oxide, and a complex of the metals listed above, and the like.

Particularly, a metal halide or a metal carboxylate is preferably used, and examples thereof include a copper chloride, copper bromide, copper iodide, nickel chloride, nickel bromide, nickel acetate, cobalt chloride, iron chloride, zinc chloride, zinc bromide, zinc iodide, zinc acetate, vanadium chloride, vanadium oxychloride, palladium chloride, palladium acetate, aluminum chloride, manganese chloride, lead chloride, lead acetate, indium chloride, titanium chloride, tin chloride, and the like.

The amount of the metal or the metal derivative used with respect to 1 mole of the phthalonitrile-based compound represented by General Formula (2) or with respect to 1 mole of the 1,3-diiminoisoindoline-based compound represented by General Formula (3) is 0.1 times by mole to 0.6 times by mole, and preferably 0.2 times by mole to 0.5 times by mole.

The reaction temperature is 60° C. to 300° C., and preferably 100° C. to 220° C.

The reaction time is 30 minutes to 72 hours, and preferably 1 to 48 hours.

It is preferable to use a solvent in the reaction. As the solvent used in the reaction, an organic solvent having a boiling point which is 60° C. or more and preferably 80° C. or more is preferable.

Examples thereof include an alcohol solvent such as methanol, ethanol, n-propyl alcohol, n-butyl alcohol, isobutyl alcohol, n-amyl alcohol, n-hexanol, 1-heptanol, 1-octanol, 1-dodecanol, benzyl alcohol, ethylene glycol, propylene glycol, ethoxyethanol, propoxyethanol, butoxyethanol, dimethyl ethanol, or diethyl ethanol, and a solvent of high boiling point such as dichlorobenzene, trichlorobenzene, chloronaphthalene, sulfolane, nitrobenzene, quinoline, 1,3-dimethyl-2-imidazolidinone (DMI), or urea.

The amount of the solvent used is 0.5 to 50 times by volume with respect to the phthalonitrile-based compound represented by General Formula (2) or the 1,3-diiminoisoindoline-based compound represented by General Formula (3), and 1 to 15 times by volume is preferable.

The reaction is performed in the presence or absence of a catalyst. It is preferable that the reaction is performed in the presence of a catalyst. As the catalyst, it is possible to use an inorganic catalyst such as ammonium molybdate or a basic organic catalyst such as 1,8-diazabicyclo[5.4.0]undec-7-ene (DBU) or 1,5-diazabicyclo[4.3.0]non-5-ene (DBN). The amount of the catalyst used with respect to 1 mole of the phthalonitrile-based compound or 1 mole of the 1,3-diiminoisoindoline-based compound is 0.01 to 10 times by mole, and preferably 1 to 2 times by mole.

The phthalocyanine compound in which M represents two hydrogen atoms can be produced by causing a reaction between metallic sodium or metallic potassium and at least one kind of compound selected from the phthalonitrile-based compound represented by General Formula (2) and the 1,3-diiminoisoindoline-based compound represented by General Formula (3) under the reaction condition described above, and then treating the reaction solution with hydrochloric acid, sulfuric acid, and the like such that the sodium or the potassium as a central metal departs.

After the reaction ends, by distilling the solvent or adding the reaction solution to a poor solvent of a phthalocyanine-based compound such that a target substance is precipitated, and filtering the precipitate, the phthalocyanine-based compound represented by General Formula (1) can be obtained. Generally, the phthalocyanine-based compound is obtained as a mixture of the isomers. By further recrystallizing the compound or purifying the compound by a known purification method such as column chromatography according to the purpose, a target substance with higher purity can be obtained.

The phthalonitrile-based compound represented by General Formula (2) can be produced with reference to known methods. For example, the phthalonitrile-based compound can be produced according to the following route with reference to Japanese Unexamined Patent Application Publication (Translation of PCT Application) No. 2003-516421.

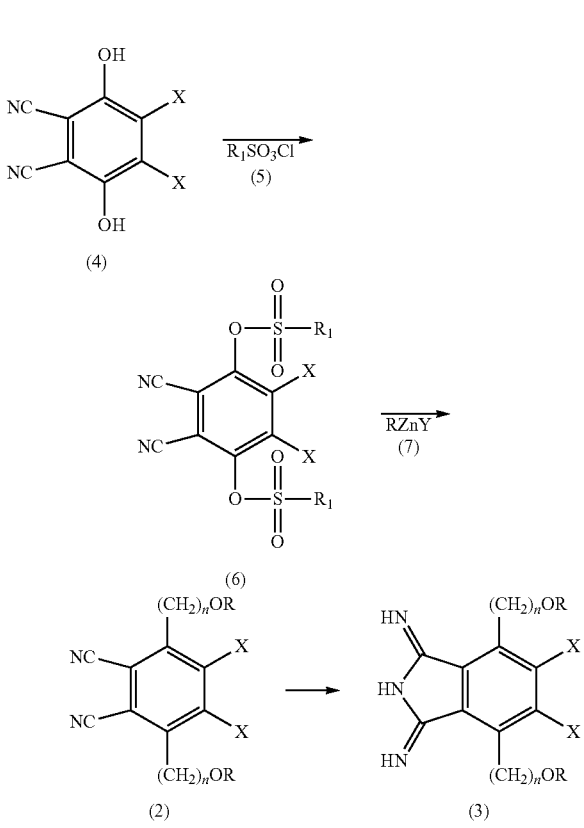

In General Formulae (4) to (6), X has the same definition as X in General Formula (2) and General Formula (3), and R: in General Formulae (5) and (6) represents an alkyl group or an aryl group. R in General Formula (7) has the same definition as R in General Formula (2) and General Formula (3), and Y in General Formula (7) represents a halogen atom.

Specifically, by causing a reaction between the phthalonitrile-based compound represented by General Formula (4) and the alkylsulfonic acid chloride or arylsulfonic acid chloride represented by (5) in an organic solvent in the presence of a base, the phthalonitrile-based compound represented by General Formula (6) can be produced.

As the alkylsulfonic acid chloride, it is possible to use methanesulfonic acid chloride, ethanesulfonic acid chloride, propanesulfonic acid chloride, trifluoromethanesulfonic acid chloride, and the like. As the arylsulfonic acid chloride, it is possible to use benzenesulfonic acid chloride, toluenesulfonic acid chloride, chlorobenzenesulfonic acid chloride, naphthalenesulfonic acid chloride, and the like.

The amount of the alkylsulfonic acid chloride or the arylsulfonic acid chloride used with respect to 1 mole of the phthalonitrile-based compound represented by General Formula (4) is 2 times by mole to 4 times by mole, preferably 2 times by mole to 3 times by mole, and more preferably 2 times by mole to 2.2 times by mole.

As the base, it is possible to use sodium hydroxide, potassium hydroxide, sodium carbonate, potassium carbonate, triethylamine, pyridine, and the like.

The amount of the base used with respect to 1 mole of the phthalonitrile-based compound represented by General Formula (4) is 2 times by mole to 4 times by mole, and preferably 2 times by mole to 3 times by mole.

The solvent is not particularly limited unless it negatively affects the reaction. As the solvent, it is possible to use dichloromethane, 1,2-dichloroethane, benzotrifluoride, acetonitrile, toluene, and the like.

Although there is no particular limitation, the amount of the solvent used with respect to 1 mole of the phthalonitrile-based compound is 500 mL to 3.0 L, and preferably 1.0 to 2.0 L. The reaction temperature is room temperature to 200° C., preferably 50° C. to 150° C., and more preferably 50° C. to 100° C. The reaction time is 10 minutes to 48 hours, preferably 20 minutes to 24 hours, and more preferably 30 minutes to 12 hours.

After the reaction ends, by distilling the solvent or adding the reaction solution to a poor solvent of a phthalonitrile-based compound such that a target substance is precipitated, and filtering the precipitate, the phthalonitrile-based compound represented by General Formula (6) can be obtained. If necessary, by further recrystallizing the compound or purifying the compound by a known purification method such as column chromatography, a product with higher purity can be obtained.

Thereafter, by cross-coupling (Negishi coupling) the phthalonitrile-based compound represented by General Formula (6) with an organic zinc reagent represented by General Formula (7) in an organic solvent in the presence of a palladium catalyst, the phthalonitrile-based compound represented by General Formula (2) can be produced.

Y represents chlorine, bromine, iodine, or fluorine. Among these, chlorine and bromine are preferable, and bromine is more preferable.

The amount of the organic zinc reagent used with respect to 1 mole of the phthalonitrile-based compound represented by General Formula (6) is 2 times by mole to 5 times by mole, and preferably 2 times by mole to 3 times by mole.

As the palladium catalyst, it is possible to use bis(triphenylphosphine)palladium (II) dichloride, bis(tri-o-tolylphosphine)palladium (II) dichloride, bis(tri-o-tolylphosphine)palladium (II) dichloride, [1,3-bis(diphenylphosphino)propane]palladium (II) dichloride, and the like.

The amount of the palladium catalyst used with respect to 1 mole of the phthalonitrile-based compound represented by General Formula (6) is 0.01 to 0.3 equivalents, and preferably 0.05 to 0.2 equivalents.

As the reaction solvent, tetrahydrofuran•diethylether•1,4-dioxane and the like can be used.

Although there is no particular limitation, the amount of the reaction solvent used with respect to 1 mole of the phthalonitrile-based compound represented by General Formula (6) is 500 mL to 3.0 L, and preferably 1.0 to 2.0 L. The reaction temperature is room temperature to 200° C., preferably 50° C. to 150° C., and more preferably 50° C. to 100° C. The reaction time is 10 minutes to 48 hours, preferably 20 minutes to 24 hours, and more preferably 30 minutes to 12 hours.

After the reaction ends, by distilling the solvent, performing extraction in an aromatic solvent such as toluene or a halogenated hydrocarbon-based solvent such as methylene chloride, rinsing the extract with water, concentrating the extract, adding a poor solvent to the concentrate such that a target substance is precipitated, and filtering the precipitate, the phthalonitrile-based compound represented by General Formula (2) can be obtained. If necessary, by further recrystallizing the compound or purifying the compound by a known purification method such as column chromatography, a product with higher purity can be obtained.

The 1,3-diiminobenzoindoline-based compound represented by General Formula (3) can be produced with reference to known methods relating to known compounds.

For example, by causing a reaction between the phthalonitrile-based compound represented by General Formula (2) and ammonia in the presence of a metal alkoxide, the 1,3-diiminobenzoindoline-based compound can be obtained.

The amount of ammonia used with respect to 1 mole of the phthalonitrile-based compound represented by General Formula (2) is 1 times by mole to 20 times by mole, and preferably 3 times by mole to 10 times by mole.

Examples of the metal alkoxide include methoxide, ethoxide, n-propoxide, n-butoxide, n-pentoxide, n-hexyloxy oxide, n-octyloxy oxide, 2-methoxyethoxide, 2-ethoxyethoxide, and 2-butoxyethoxide of sodium or potassium, and the like.

The amount of the metal alkoxide used with respect to the phthalonitrile-based compound represented by General Formula (2) is 0.01 times by mole to 5 times by mole, and preferably 0.1 times by mole to 2.0 times by mole.

In the reaction, it is preferable to use an organic solvent in combination. Generally, as the organic solvent, an alcohol-based solvent is used. Examples of the alcohol-based solvent include methanol, ethanol, n-propanol, n-butanol, n-pentanol, n-hexanol, n-heptanol, n-octanol, 2-methoxyethanol, 2-ethoxyethanol, 2-butoxyethanol, and the like.

The amount of the alcohol-based solvent used with respect to 1 mole of the phthalonitrile-based compound represented by General Formula (2) is 200 mL to 15 L, and preferably 500 mL to 5 L. In the reaction operation, metallic sodium or metallic potassium may be added to the alcohol-based solvent as a reaction solvent such that an alcohol solution containing a metal alkoxide is prepared, and then ammonia and the phthalonitrile-based compound represented by General Formula (2) may be added such that a reaction occurs. Alternatively, as another method, ammonia, the phthalonitrile-based compound represented by General Formula (2), and a separately prepared metal alkoxide may be added to a reaction solvent such that a reaction occurs. The amount of the metal used for preparing the metal alkoxide with respect to the phthalonitrile-based compound represented by General Formula (2) is 0.01 times by mole to 5 times by mole, and preferably 0.1 times by mole to 2.0 times by mole. The reaction temperature is 0° C. to a reflux temperature of the solvent, and preferably 20° C. to a reflux temperature of the solvent. The reaction time is preferably 30 minutes to 72 hours. After the reaction ends, by distilling the solvent, performing extraction in an aromatic solvent such as toluene or a halogenated hydrocarbon-based solvent such as methylene chloride, rinsing the extract with water, concentrating the extract, and filtering the precipitate, the 1,3-diiminobenzoindoline-based compound represented by General Formula (3) can be obtained.

[Near-Infrared Absorbing Material]

Hereinafter, a near-infrared absorbing material of the present invention will be described.

The phthalocyanine-based compound of the present invention is extremely useful as a near-infrared absorbing material having a wide range of uses such as a heat ray shielding material for shielding out heat rays, an optical filter for a plasma display or a liquid crystal display, a flash fixing toner, a photothermal conversion agent for thermosensitive transfer• thermosensitive stencil, and the like, a photothermal conversion agent for laser welding, a pre-heating aid used for molding and processing a PET bottle, an optical recording medium using a semiconductor laser, a near-infrared absorbing colorant used in an optical character reader, a photosensitive colorant for treating tumors, and a near-infrared absorbing filter. The near-infrared absorbing material of the present invention may be the phthalocyanine-based compound of the present invention represented by General Formula (1), or may contain the phthalocyanine-based compound represented by General Formula (1) in addition to other components such as a binder resin or additives. The aspects or components of the near-infrared absorbing material vary with the uses of the material and are diverse.

[Heat Ray Shielding Material]

Hereinafter, a heat ray shielding material of the present invention will be described.

The phthalocyanine-based compound of the present invention is suitably used in a heat ray shielding material used in films or interlayers utilized in windows of building or automobiles, a PVC greenhouse, a sun visor, welding goggles, and the like.

The heat ray shielding material of the present invention contains the phthalocyanine-based compound of the present invention represented by General Formula (1). The phthalocyanine-based compound represented by General Formula (1) contained in the heat ray shielding material of the present invention may be used in the form of a single compound or a mixture of two or more kinds of compounds.

The heat ray shielding material of the present invention may be used in any of known forms without particular limitation.

Specifically, for example, the heat ray shielding material may be used in the following forms.

1. The form that a molded product, which contains the phthalocyanine-based compound represented by General Formula (1) and a resin as essential components, is used.

2. The form that a coating layer and a film, or the like, which contains the phthalocyanine-based compound represented by General Formula (1) and a resin as essential components, is applied over a substrate.

3. The form that a laminate is obtained by providing a film or the like, which contains the phthalocyanine-based compound represented by General Formula (1) and a resin as essential components, as an interlayer between two or more sheets of substrates.

4. The form that the phthalocyanine-based compound represented by General Formula (1) is contained in a substrate.

The substrate is not particularly limited, and examples thereof include a glass plate; a plastic plate including a plate material such as polycarbonate, polymethyl methacrylate, polystyrene, polyethylene terephthalate, polyvinyl chloride, polysulfone, unsaturated polyester; and the like.

Among the forms described above, particularly, "2. The form that a coating layer and a film, or the like, which contains the phthalocyanine-based compound represented by General Formula (1) and a resin as essential components, is applied over a substrate" and "3. The form that a laminate is obtained by providing a film or the like, which contains the phthalocyanine-based compound represented by General Formula (1) and a resin as essential components, as an interlayer between two or more sheets of substrates" are preferable. As described above, in a preferred aspect, the heat ray shielding material of the present invention contains the phthalocyanine-based compound represented by General Formula (1) and a resin as essential components.

The resin can be appropriately selected according to the use of the heat ray shielding material. It is preferable to use a resin which is substantially transparent and does not significantly absorb or scatter light.

Specifically, examples thereof include a polycarbonate resin; a (meth)acryl resin such as methyl methacrylate; a polyvinyl resin such as polystyrene, polyvinyl chloride, or polyvinylidene chloride; a polyolefin resin such as polyethylene or polypropylene; a polybutyral resin; a vinyl acetate-based resin such as polyvinyl acetate; a polyester resin; a polyamide resin; a polyvinyl acetal resin; a polyvinyl alcohol resin; an ethylene-vinyl acetate copolymer resin; an ethylene-acryl copolymer resin; a polyurethane resin, and the like. Furthermore, as long as the resin is substantially transparent, not only one kind of resin described above, but also a mixture obtained by blending two or more kinds of resins described above can also be used. In addition, the resin described above can also be used by being interposed between transparent glasses.

Among the above resins, a polycarbonate resin, a (meth) acryl resin, a polyester resin, a polyamide resin, a polystyrene resin, a polyvinyl chloride resin, a polyvinyl acetal resin, and a polyvinyl alcohol resin are preferable, and a polycarbonate resin, a methacryl resin, a polyethylene terephthalate (PET) resin, a polyvinyl chloride resin, and a polyvinyl acetal resin are particularly preferable.

The polycarbonate resin is produced by causing a reaction between divalent phenol and a carbonate precursor by a solution method or a melting method. Typical examples of the divalent phenol include 2,2-bis(4-hydroxyphenyl)propane [bisphenol A], 1,1-bis(4-hydroxyphenyl)ethane, 1,1-bis(4-hydroxyphenyl)cyclohexane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)sulfide, bis(4-hydroxyphenyl)sulfone, and the like. As the divalent phenol, a bis(4-hydroxyphenyl)alkane-based compound is preferable, and a compound containing bisphenol as a main component is particularly preferable.

Examples of the (meth)acryl resin include only methyl methacrylate, a mixture of polymerizable unsaturated monomers with a methyl methacrylate content 50% or more, and a copolymer thereof. Examples of the polymerizable unsaturated monomers copolymerizable with methyl methacrylate include methyl acrylate, ethyl (meth)acrylate, butyl (meth)acrylate, cyclohexyl (meth)acrylate, 2-ethylhexyl (meth)acrylate, methoxyethyl (meth)acrylate, ethoxyethyl (meth)acrylate, 2-hydroxyethyl (meth)acrylate, N,N-diethylaminoethyl (meth)acrylate, glycidyl (meth)acrylate, tribromophenyl (meth)acrylate, tetrahydroxyfurfuryl (meth)acrylate, ethylene glycol di(meth)acrylate, triethylene glycol di(meth)acrylate, triporpylene glycol di(meth)acrylate, trimethylolethane di(meth)acrylate, neopentyl glycol di(meth)acrylate, trimethylolpropane tri(meth)acrylate, pentaerythritol tetra(meth)acrylate, and the like.

Typical examples of the polyester resin include homopolyester such as poly C2-4 alkylene terephthalate or poly C2-4 alkylene naphthalate, copolyester containing a C2-4 alkylene arylate unit (C2-4 alkylene terephthalate and/or C2-4 alkylene naphthalate unit) as a main component, and the like. The polyester resin also includes a polyarylate-based resin, aliphatic polyester using aliphatic dicarboxylic acid such as adipic acid, and a homopolymer or copolymer of lacton such as ε-caprolactone. For example, as the polyester resin, in view of high transparency, polyethylene terephthalate (PET), polytrimethylene terephthalate (PTT), polybutylene terephthalate (PBT), polyethylene naphthalate (PEN), and the like are preferable. Furthermore, amorphous copolyester such as C2-4 alkylene arylate-based copolyester is also preferable because this compound has excellent processability. Particularly, PET is preferable because this compound can be mass-produced and is excellent in heat resistance, strength, and the like.

The polyamide resin is a resin having the structure of a dehydropolycondensate of diamine compounds containing an aromatic or aliphatic group and dicarboxylic acid compounds containing an aromatic or aliphatic group. The aliphatic group also includes an alicyclic aliphatic group. Examples of the diamine compounds include hexamethylenediamine, m-xylenediamine, bis(4-aminocyclohexyl)methane, bis(4-amino-3-methylcyclohexyl)methane, trimethyl hexamethylenediamine, bis(aminomethyl)norbornane, bis(aminomethyl)tetrahydrodicyclopentadiene, and the like. Examples of the dicarboxylic acid compounds include adipic acid, dodecane dicarboxylic acid, isophthalic acid, terephthalic acid, bis(hydroxycarbonylmethyl)norbornane, bis(hydroxycarbonylmethyl)tetrahydrodicyclopentadiene, and the like. As the polyamide resin, particularly, from the viewpoint of transparency, an amorphous polyamide resin is preferable. Furthermore, generally, resins called transparent nylon are preferable.

As the polyvinyl chloride resin, not only a polymer containing only a vinyl chloride monomer, but also a copolymer containing vinyl chloride as a main component can also be used. Examples of monomers copolymerizable with vinyl chloride include vinylidene chloride, ethylene, propylene, acrylonitrile, vinyl acetate, maleic acid, itaconic acid, acrylic acid, methacrylic acid, and the like.

Examples of the polyvinyl acetal resin include a polyvinyl formal resin obtained by causing a reaction between polyvinyl alcohol (PVA) and formaldehyde, a polyvinyl acetal resin obtained by causing a reaction between PVA and acetaldehyde in a narrow sense, a polyvinyl butyral resin (PVB) obtained by causing a reaction between PVA and n-butyraldehyde, and the like. Among these, PVB is preferable. The average degree of polymerization of PVA used for synthesizing the polyvinyl acetal resin is preferably 200 to 5,000, and more preferably 500 to 3,000. The degree of acetalization of the polyvinyl acetal resin is preferably 40 to 85 mol %, and more preferably 50 to 75 mol %.

The polyvinyl alcohol resin is obtained, for example, by saponifying polyvinyl acetate. The degree of saponification of the polyvinyl alcohol resin is generally within a range of 70 to 99.9 mol %, preferably within a range of 75 to 99.8 mol %, and even more preferably within a range of 80 to 99.8 mol %. The average degree of polymerization of the polyvinyl alcohol resin is preferably 500, and more preferably 1,000 or more and 5,000 or less.

In the heat ray shielding material of the present invention, the content of the tetraphenyl naphthalocyanine-based compound of the present invention represented by General Formula (1) varies with the thickness of the heat ray shielding material.

For example, in a case where a heat ray shielding plate having a thickness of 3 mm is prepared, the content of the tetraphenyl naphthalocyanine-based compound with respect to 100 parts by weight of a resin mixed with the heat ray shielding material is preferably 0.002 to 0.06 parts by weight, and more preferably 0.003 to 0.02 parts by weight. Furthermore, for example, in a case where a heat ray shielding plate having a thickness of 10 mm is prepared, the content of the tetraphenyl naphthalocyanine-based compound with respect to 100 parts by weight of a resin is preferably 0.0005 to 0.02 parts by weight, and more preferably 0.001 to 0.005 parts by weight. In a case where a heat ray shielding film having a thickness of 10 μm is prepared, the content of the tetraphenyl naphthalocyanine-based compound with respect to 100 parts by weight of a resin is preferably 0.1 to 20 parts by weight, and more preferably 0.5 to 10 parts by weight. Provided that the content of the phthalocyanine-based compound represented by General Formula (1) is described regardless of the thickness of the heat ray shielding material, the amount of the phthalocyanine-based compound mixed in that is regarded as weight in a projection area from above is preferably 0.01 to 5.0 g/m$^2$, and more preferably 0.05 to 1.0 g/m$^2$. In a case where the amount of the phthalocyanine-based compound represented by General Formula (1) mixed in is less than 0.01 g/m$^2$, the heat ray shielding effect is reduced. In a case where the amount of the phthalocyanine-based compound represented by General Formula (1) mixed in is greater than 5.0 g/m$^2$, sometimes the transmission of visible rays is reduced.

The heat ray shielding material of the present invention may contain various additives used for producing general transparent resin materials, in addition to the phthalocyanine-based compound represented by General Formula (1). Examples of the additives include a coloring agent, a polymerization regulator, an antioxidant, an ultraviolet absorber, a heat ray shielding agent, a flame retardant, a plasticizer, rubber for enhancing impact resistance, a release agent, and the like. The heat ray shielding agent means particles capable of absorbing infrared having a wavelength equal to or longer than 780 nm, and examples thereof include a metal oxide such as aluminum-doped tin oxide, indium-doped tin oxide, tin-doped indium oxide (ITO), antimony-doped tin oxide (ATO), or aluminum-doped zinc oxide (AZO), a tungsten oxide, a composite tungsten oxide, and the like. Particularly, tin-doped indium oxide (ITO) is preferable.

The amount of additives added to the heat ray shielding material is not particularly limited, and is generally equal to or smaller than 10% by mass in the heat ray shielding material.

Particularly, in a case where the heat ray shielding material of the present invention is used against sunlight and the like, in a preferred aspect, the heat ray shielding material contains an ultraviolet absorber. As the ultraviolet absorber, known ultraviolet absorbers can be used without particular limitation. Specifically, compounds based on salicylic acid, benzophenone, benzotriazole, and cyanoacrylate are suitably used.

The heat ray shielding material of the present invention may contain another near-infrared absorbing material in addition to the phthalocyanine-based compound represented by General Formula (1). As the aforementioned another near-infrared absorbing material, a known near-infrared absorbing material can be appropriately selected without particular limitation depending on the maximum absorption wavelength desired according to use.

In the present invention, the shape of the heat ray shielding material is not particularly limited, and includes various shapes such as a flat plate shape or a film shape which is most generally adopted, a corrugated plate shape, a spherical shape, and a dome shape.

In a case where the heat ray shielding material of the present invention has a flat plate shape or a film shape, by mixing the phthalocyanine-based compound represented by General Formula (1) with a resin and, if necessary, the aforementioned additives or another near-infrared absorbing material and then molding the mixture, the heat ray shielding material is obtained. As the molding method, known molding methods can be used without particular limitation. Specifically, examples thereof include extrusion molding, injection molding, cast polymerization, press molding, calendar molding, cast film formation, and the like.

In a case where the heat ray shielding material of the present invention is used in the form that a film, or the like, which contains the phthalocyanine-based compound represented by General Formula (1) and a resin as essential components, is applied over a substrate, by laminating the film-like or sheet-like heat ray shielding material to the substrate by using an adhesive, a pressure sensitive adhesive, an adhesive film, and the like, the heat ray shielding material can be used in the form described above. Alternatively, by heat pressing or heat laminating the film-like or sheet-like heat ray shielding material over the substrate, the heat ray shielding material can be used in the form described above.

In a case where the heat ray shielding material of the present invention is used in the form that a coating layer, or the like, which contains the phthalocyanine-based compound represented by General Formula (1) and a resin as essential components, is applied over a substrate, by preparing a paint (liquid or paste-like material), which contains the phthalocyanine-based compound represented by General Formula (1), a resin, and, if necessary, a solvent dissolving the compound and the resin, and other components, and coating the substrate with the paint, the film can be used in the form of the coating layer described above.

In a case where the heat ray shielding material of the present invention is used in the form that a laminate is obtained by providing a film or the like, which contains the phthalocyanine-based compound represented by General Formula (1) and a resin as essential components, as an interlayer between two or more sheets of substrates, for example, by interposing a film, which contains the phthalocyanine-based compound represented by General Formula (1) and a resin as essential components, between substrates, putting the laminate into a rubber pack, and heating the laminate while performing suction under reduced pressure such that the substrates and the film are bonded to each other in a vacuum, the heat ray shielding material can be used in the form of the laminate described above. Furthermore, by interposing a film, which contains the phthalocyanine-based compound represented by General Formula (1) and a resin as essential components, between substrates, or coating one substrate with a paint, which contains the phthalocyanine-based compound represented by General Formula (1), a resin, and, if necessary, a solvent dissolving the compound and the resin, or other components, and then placing another substrate thereon, and bonding the laminate of these by heat or the like, the heat ray shielding material can be used in the form of the laminate described above. In addition, by bonding substrates to each other by using an adhesive, which contains the phthalocyanine-based compound represented by General Formula (1) and a resin, or a composition which contains the phthalocyanine-based compound represented by General Formula (1) and a resin as a pressure sensitive adhesive, the heat ray shielding material can be used in the form of the laminate described above.

The uses of the heat ray shielding material of the present invention are not particularly limited, and examples thereof include a film or an interlayer used in windows of buildings or automobiles for shielding out heat rays of solar energy, a sun visor, welding goggles, and the like. Particularly, the phthalocyanine compound represented by General Formula (1) of the present invention is excellently soluble in a solvent and excellently compatible with a resin and is excellent in various characteristics such as heat resistance, light fastness, and weather fastness. Therefore, the phthalocyanine compound is suitable as a film or an interlayer used in windows of building or automobiles, and the like.

[Heat Ray Shielding Film]

Hereinafter, a case where the heat ray shielding material of the present invention is a heat ray shielding film used by being bonded to window glass of buildings and the like will be described.

The constitution of the heat ray shielding film is not particularly limited, and examples thereof include the following.

1. A form that the heat ray shielding film is a film containing the phthalocyanine-based compound represented by General Formula (1) and a resin.

2. A form that the heat ray shielding film has a film, which contains the phthalocyanine-based compound represented by General Formula (1) and a resin, a pressure sensitive adhesive layer, and, if necessary, a release sheet provided over a surface of the pressure sensitive adhesive layer.

3. A form that the heat ray shielding film is obtained by providing a layer, which contains the phthalocyanine-based compound represented by General Formula (1) and a resin, over a substrate.

4. A form that the heat ray shielding film has a layer, which contains the phthalocyanine-based compound represented by General Formula (1) and a resin as a pressure sensitive adhesive, and if necessary, a release sheet, which is provided on a surface of the pressure sensitive adhesive layer, on a substrate.

5. A form that the heat ray shielding film has a substrate, a layer, which contains the phthalocyanine-based compound represented by General Formula (1) and a resin, a pressure sensitive adhesive layer, and if necessary, a release sheet which is provided on a surface of the pressure sensitive adhesive layer.

Among the above aspects, in view of ease of bonding to window glass and the like, the aspect in which the heat ray shielding film has a pressure sensitive adhesive layer is preferable, and the aspect 4. or 5. is particularly preferable.

In addition to these aspects, according to purpose, the heat ray shielding film may be provided with other layers such as a hardcoat layer, an antifouling layer, an ultraviolet absorbing layer, and an antireflection layer.

Examples of the resin that the heat ray shielding film contains together with the phthalocyanine-based compound represented by General Formula (1) are the same as the examples of the resin that the heat ray shielding material contains. Particularly, a polycarbonate resin, a (meth)acryl resin, a polyvinyl resin, a polyolefin resin, a polybutyral resin, a polyester resin, a polyamide-based resin, and a polyurethane resin are preferable.

Examples of the substrate are the same as the examples of the substrate described above regarding the usage form of the heat ray shielding material. As the substrate, a sheet or plate made of resin is preferable. Examples thereof include films of polyester, polyethylene, polypropylene, nylon, polyvinyl chloride, polycarbonate, polyvinyl alcohol, polymethyl methacrylate, a fluororesin, ethylene, a vinyl alcohol resin, and the like. Among these, a polyester film is preferable, and a polyethylene terephthalate (PET) film is more preferable.

The pressure sensitive adhesive is not particularly limited as long as it can be bonded to the substrate and has transparency. Examples thereof include a hardening resin pressure sensitive adhesive containing a thermoplastic resin, a thermosetting resin or actinic energy ray-curable resin such as (meth)acryl; (meth)acryl urethane; (meth)acryl silicone; silicone having a siloxane bond on a main chain; polyvinyl chloride; melamine; urethane; styrene; alkyd; phenol; epoxy; polyester; and a fluorine-based resin such as polyvinylidene fluoride, a rubber-based pressure sensitive adhesive such as natural rubber, butyl rubber, isopropylene rubber, ethylene propylene rubber, methyl rubber, chloroprene rubber, ethylene-propylene copolymer rubber, styrene-butadiene rubber, or acrylonitrile-butadiene rubber, and the like.

Examples of the resin as a pressure sensitive adhesive include a hardening resin pressure sensitive adhesive containing a thermoplastic resin, thermosetting resin or actinic energy ray-curable resin described above. As the resin, a (meth)acryl-based resin is preferable, and a poly(meth) acrylic acid ester-based resin having a glass transition temperature less than 0° C. is particularly preferable.

As the poly(meth)acrylic acid ester-based resin, a resin is preferable in which a (meth)acrylic acid ester having an alkyl group containing 1 to 14 carbon atoms is used as a monomer in an amount equal to or greater than 50% by weight.

Examples of the copolymerizable monomer include (meth)acrylates such as hydroxyethyl (meth)acrylate, hydroxypropyl (meth)acrylate, methoxyethyl (meth)acrylate, ethoxyethyl (meth)acrylate, and ethoxyethoxyethyl (meth)acrylate; a styrene-based monomer represented by α-methyl styrene, vinyl toluene, styrene, and the like; a vinyl ether-based monomer represented by methyl vinyl ether, ethyl vinyl ether, isobutyl vinyl ether, and the like; fumaric acid, a monoalkyl ester of fumaric acid, and a dialkyl ester of fumaric acid; maleic acid, a monoalkyl ester of maleic acid, and dialkyl ester of maleic acid, itaconic acid, a monoalkyl ester of itaconic acid, a dialkyl ester of itaconic acid, (meth)acrylonitrile, vinyl chloride, vinylidene chloride, vinyl acetate, vinyl ketone, vinyl pyridine, vinyl carbazole, and the like.

As a curing agent of the acryl-based pressure sensitive adhesive, an isocyanate-based curing agent, an epoxy-based curing agent, a metal chelate curing agent, and the like are used.

Each of the layers constituting the heat ray shielding film may contain the same additives as the various additives used for producing the heat ray shielding material described above. Examples thereof include a coloring agent, a polymerization regulator, an antioxidant, a light stabilizer, an ultraviolet absorber, a flame retardant, an antistatic agent, a plasticizer, and the like. In a preferred aspect, each of the layers contains an antioxidant, a flame retardant, an adhesion adjuster, an anti-moisture agent, a fluorescence brightening agent, and an infrared absorber, and particularly, an ultraviolet absorber.

Furthermore, as long as the visible light transmittance is not reduced, a material such as carbon black that is capable of absorbing heat rays may be used in combination.

The thickness of the heat ray shielding film varies with the constitution of the heat ray shielding film, the type of the substrate or the resin of the heat ray shielding layer, uses thereof, and the like. Generally, a heat ray shielding film having a thickness of about 10 μm to 500 μm is preferably used.

For example, in a case where the heat ray shielding film is obtained by providing a layer, which contains the phthalocyanine-based compound represented by General Formula (1) and a resin, on a substrate, the thickness of the substrate is preferably about 20 μm to 300 μm. Furthermore, the thickness of the layer containing the phthalocyanine-based compound represented by General Formula (1) and a resin is preferably about 0.3 to 100 μm.

The content of the phthalocyanine-based compound represented by General Formula (1) with respect to the resin depends on the thickness of the layer containing the phthalocyanine-based compound represented by General Formula (1) and a resin. Generally, the content of the phthalocyanine-based compound represented by General Formula (1) with respect to 100 parts by weight of the resin is preferably within a range of 0.001 to 30 parts by weight, and more preferably within a range of 0.01 to 10 parts by weight.

As a process for producing the heat ray shielding film of the present invention, the phthalocyanine-based compound represented by General Formula (1) and a resin are mixed with the aforementioned additives and other near-infrared absorbers or ultraviolet absorbers which are used if necessary, and then the mixture is molded. The molding method is not particularly limited. Known molding methods can be used directly or used by being appropriately modified. Specifically, extrusion molding, injection molding, cast polymerization, press molding, calendar molding, cast film formation, and the like can be suitably used.

Furthermore, by preparing a resin film containing the phthalocyanine-based compound represented by General Formula (1) and heat pressing or heat laminating the film over a resin material, the heat ray shielding film can be produced. In addition, by printing an acryl resin ink or paint containing the phthalocyanine-based compound represented by General Formula (1) on a resin material or by coating the resin material with the acryl resin ink or paint, the heat ray shielding film can be produced.

[Interlayer for Laminated Glass]

Hereinafter, a case where the heat ray shielding material of the present invention is an interlayer for laminated glass used in window glass of automobiles and the like will be described.

The interlayer for laminated glass is a resin film used by being interposed between two sheets of glass. In a case where the heat ray shielding material of the present invention is the interlayer for laminated glass, the interlayer contains the phthalocyanine-based compound represented by General Formula (1) and a resin as essential components.

The resin is not particularly limited as long as the resin makes it possible to secure sufficient visibility when the resin is used in laminated glass, and preferably as long as the visible light transmittance of laminated glass prepared using the resin is 70% or more.

Examples of the resin include thermoplastic resins that have been conventionally used for interlayers, such as a polyvinyl acotal-based resin, a polyvinyl chloride-based resin, a saturated polyester-based resin, a polyurethane-based resin, an ethylene-vinyl acetate copolymer-based resin, and an ethylene-ethyl acrylate copolymer-based resin. Particularly, a plasticized polyvinyl acetal-based resin is preferable.

Examples of the polyvinyl acetal-based resin include a polyvinyl formal resin obtained by causing a reaction between polyvinyl alcohol (PVA) and formaldehyde, a polyvinyl acetal resin obtained by causing a reaction between PVA and acetaldehyde in a narrow sense, a polyvinyl butyral resin (PVB) obtained by causing a reaction between PVA and n-butyraldehyde, and the like. Among these, a polyvinyl butyral resin (PVB) is particularly preferable.

The average degree of polymerization of PVA used for synthesizing the polyvinyl acetal-based resin is preferably 200 to 5,000, and more preferably 500 to 3,000. The degree of acetalization of the polyvinyl acetal-based resin is preferably 40 to 85 mol %, and more preferably 50 to 75 mol %. Furthermore, the amount of residual acetyl groups is preferably equal to or smaller than 30 mol %, and more preferably 0.5 to 24 mol %.

Examples of the thermoplastic resin, preferably the plasticizer used for plasticizing the polyvinyl acetal-based resin, include an organic acid ester-based plasticizer based on a monobasic organic acid ester or a polybasic organic acid ester, a phosphoric acid-based plasticizer based on organic phosphoric acid or organic phosphorous acid, and the like.

The thickness of the interlayer for laminated glass changes according to the type of the resin, the use of the resin, and the like. Generally, the thickness of the interlayer for laminated glass is preferably within a range of 0.1 to 3 mm, and more preferably within a range of 0.3 mm to 1.5 mm.

The content of the phthalocyanine-based compound represented by General Formula (1) with respect to the resin is not particularly limited. The content of the phthalocyanine-based compound represented by General Formula (1) with respect to 100 parts by weight of the resin is preferably within a range of 0.001 to 2 parts by weight, and more preferably within a range of 0.005 to 0.5 parts by weight.

The interlayer for laminated glass of the present invention may contain the same additives as the various additives used for synthesizing the heat ray shielding material described above. Examples thereof include a heat ray shielding agent, an ultraviolet absorber, an antioxidant, a light stabilizer, a flame retardant, an antistatic agent, an adhesion adjuster, an anti-moisture agent, a fluorescence brightening agent, a coloring agent, an infrared absorber, and the like. Particularly, an aspect is preferable in which the interlayer for laminated glass contains an ultraviolet absorber.

The interlayer for laminated glass of the present invention can be produced, for example, by the same method as the method used for producing the heat ray shielding material and the heat ray shielding film described above.

If necessary, the interlayer for laminated glass of the present invention may have a multilayer structure combined with a functional transparent layer having any one or more functions among a function of a primer, a function of cutting off ultraviolet rays, a flame retarding function, an antireflection function, an antiglare function, antireflection and antiglare functions, and an antistatic function. The laminated glass in which the interlayer for laminated glass of the present invention is used is constituted with at least two sheets of transparent glass substrates and the interlayer of the present invention that is interposed between the substrates and integrated with the substrates by being bonded thereto.

The transparent glass substrate is not particularly limited, and examples thereof include various inorganic glass plates such as a float glass plate, a polished glass plate, a flat glass plate, a curved glass plate, a single strength glass plate, a patterned glass plate, a figured glass plate with metal wires, an ultraviolet absorbing glass plate, clear glass, and a colored glass plate, organic glass plates such as a polycarbonate plate and a polymethyl methacrylate plate, and the like. One kind of transparent glass substrate described above may be used singly, or two or more kinds of transparent glass substrates described above may be used in combination.

The laminated glass can be prepared, for example, by a method of interposing the interlayer of the present invention between two sheets of transparent glass substrates, putting the laminate in a vacuum bag, performing preliminary bonding the substrates and the interlayer to each other at a temperature of about 70° C. to 110° C. in a state of performing suction under reduced pressure such that the internal pressure of the vacuum bag is reduced and becomes about −65 to −100 kPa, and then performing main bonding the substrates and the interlayer to each other at a temperature of about 120° C. to 150° C. in an autoclave in a state of performing suction under reduced pressure such that the internal pressure of the autoclave is reduced and becomes about 0.98 to 1.47 MPa.

EXAMPLES

Hereinafter, the present invention will be more specifically described based on examples, but the present invention is not limited thereto.

[Example 1] Producing of Phthalocyanine-Based Compound (Specific Example (1)-30)

4,7-Bis(4-methoxybutyl)-1,3-diiminobenzoisoindoline (18.6 g), 4.76 g of vanadium trichloride, and 13.74 g of DBU were stirred in 100 mL of 1-pentanol for 24 hours at an internal temperature of 125° C. Methanol (600 ml) was added thereto, the precipitate was collected by filtration, dried and purified by column chromatography (silicagel/toluene), thereby obtaining 14.5 g of dark green powder. From the following analysis results, it was confirmed that the obtained compound is the intended compound.

MS: (EI)m/z 1267M+)

Values of elementary analysis: actual measurement values (C: 68.20%, H: 7.66%, N: 8.82%); theoretical values (C: 68.17%, H: 7.63%, N: 8.83%)

A toluene solution of the compound obtained in this way had maximum absorption at 734.0 nm, and the gram absorption coefficient thereof was 1.21×10$^5$ mL/g·cm. The absorption spectrum chart thereof is illustrated in FIG. 1.

[Example 2] Producing of Phthalocyanine-Based Compound (Specific Example (1)-33)

Figure 2:
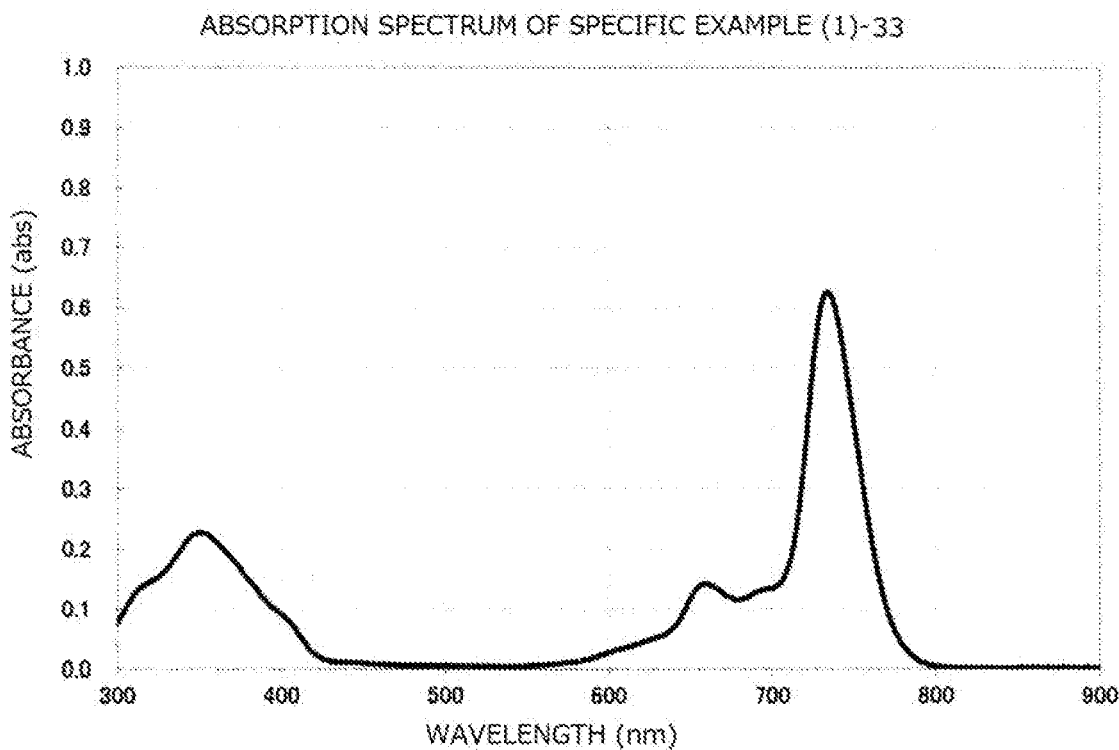
FIG. 2 is an absorption spectrum of a compound (1)-33 produced in Example 2.

Dark green powder (14.8 g) was obtained in the same manner as in Example 1, except that 20.3 g of 4,7-bis(4-ethoxybutyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 1379M+)
Values of elementary analysis: actual measurement values (C: 69.57%, H: 8.15%, N: 8.08%); theoretical values (C: 69.59%, H: 8.18 N: 8.12%)
A toluene solution of the compound obtained in this way had maximum absorption at 734.0 nm, and the gram absorption coefficient thereof was 1.19×10$^5$ mL/g·cm. The absorption spectrum chart thereof is illustrated in FIG. 2.

[Example 3] Producing of Phthalocyanine-Based Compound (Specific Example (1)-37)

Figure 3:
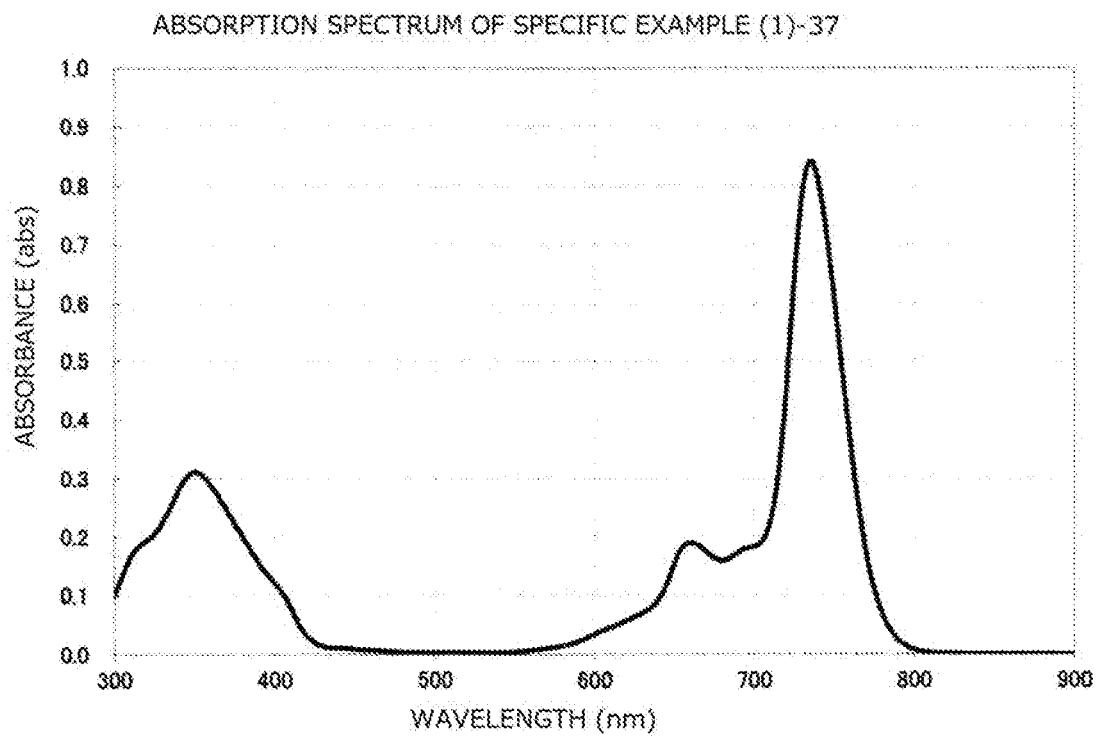
FIG. 3 is an absorption spectrum of a compound (1)-37 produced in Example 3.

Dark green powder (17.7 g) was obtained in the same manner as in Example 1, except that 25.9 g of 4,7-bis(4-phenoxybutyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 1764M+)
Values of elementary analysis: actual measurement values (C: 76.24%, H: 6.42%, N: 6.36%); theoretical values (C: 76.21%, H: 6.40% N: 6.35%)
A toluene solution of the compound obtained in this way had maximum absorption at 735.5 nm, and the gram absorption coefficient thereof was 8.63×10$^4$ mL/g·cm. The absorption spectrum chart thereof is illustrated in FIG. 3.

[Example 4] Producing of Phthalocyanine-Based Compound (Specific Example (1)-39)

Figure 4:
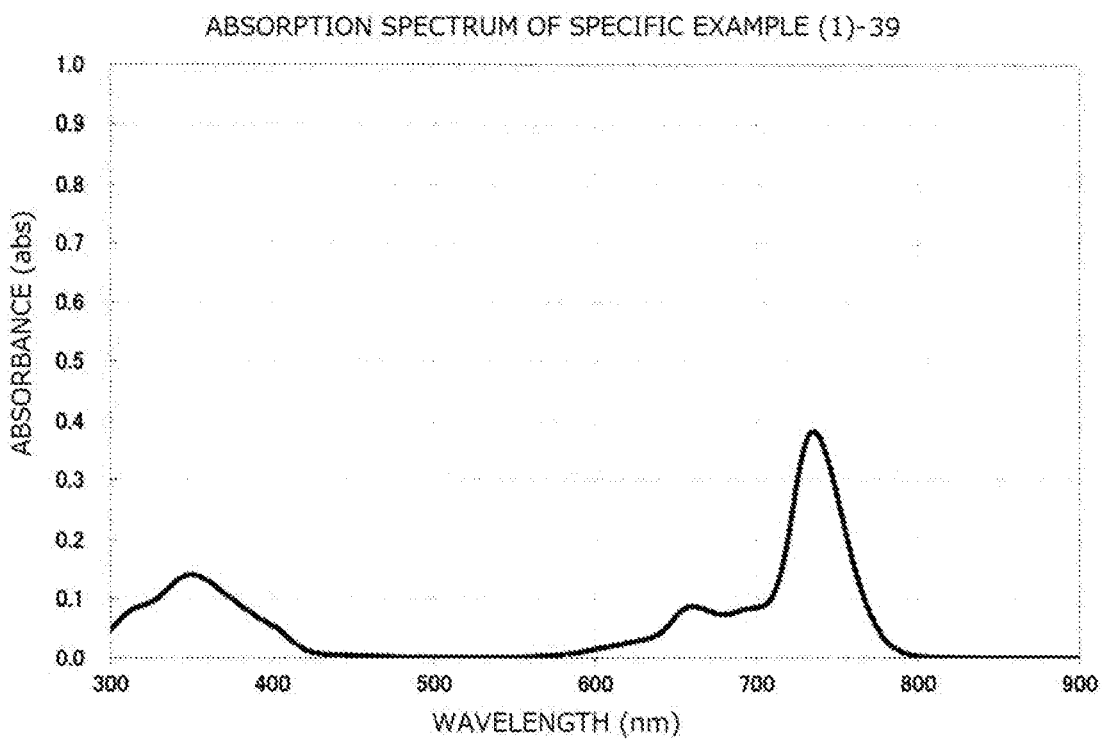
FIG. 4 is an absorption spectrum of a compound (1)-39 produced in Example 4.

Dark green powder (5.9 g) was obtained in the same manner as in Example 1, except that 29.4 g of 4,7-bis(4-(3-methoxyphenoxy)butyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 2003M+)
Values of elementary analysis: actual measurement values (C: 71.85%, H: 6.44%, N: 5.57%); theoretical values (C: 71.87%, H: 6.43% N: 5.59%)
A toluene solution of the compound obtained in this way had maximum absorption at 735.5 nm, and the gram absorption coefficient thereof was 7.40×10$^4$ mL/g·cm. The absorption spectrum chart thereof is illustrated in FIG. 4.

[Example 5] Producing of Phthalocyanine-Based Compound (Specific Example (1)-42)

Figure 5:
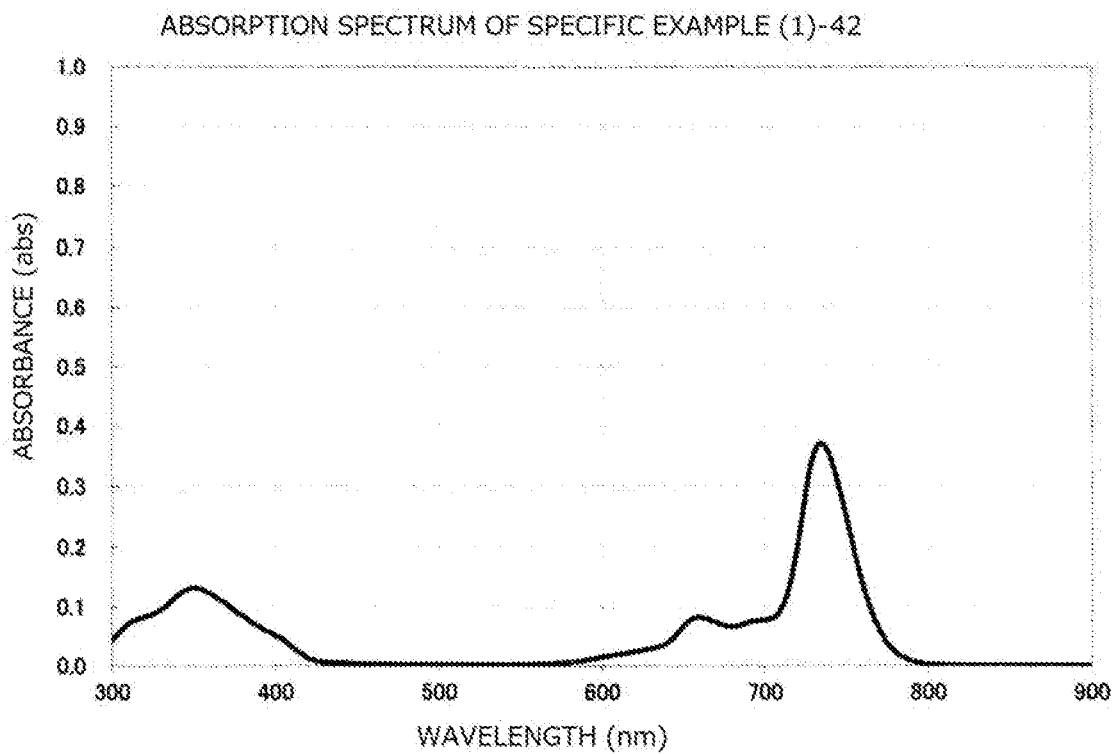
FIG. 5 is an absorption spectrum of a compound (1)-42 produced in Example 5.

Dark green powder (13.0 g) was obtained in the same manner as in Example 1, except that 32.5 g of 4,7-bis(4-(4-(tert-butyl)phenoxy)butyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 2213M+)
Values of elementary analysis: actual measurement values (C: 78.15%, H: 8.02%, N: 5.08%); theoretical values (C: 78.12%, H: 8.01% N: 5.06%)
A toluene solution of the compound obtained in this way had maximum absorption at 734.5 nm, and the gram absorption coefficient thereof was 7.10×10$^4$ mL/g·cm. The absorption spectrum chart thereof is illustrated in FIG. 5.

[Example 6] Producing of Phthalocyanine-Based Compound (Specific Example (1)-43)

Figure 6:
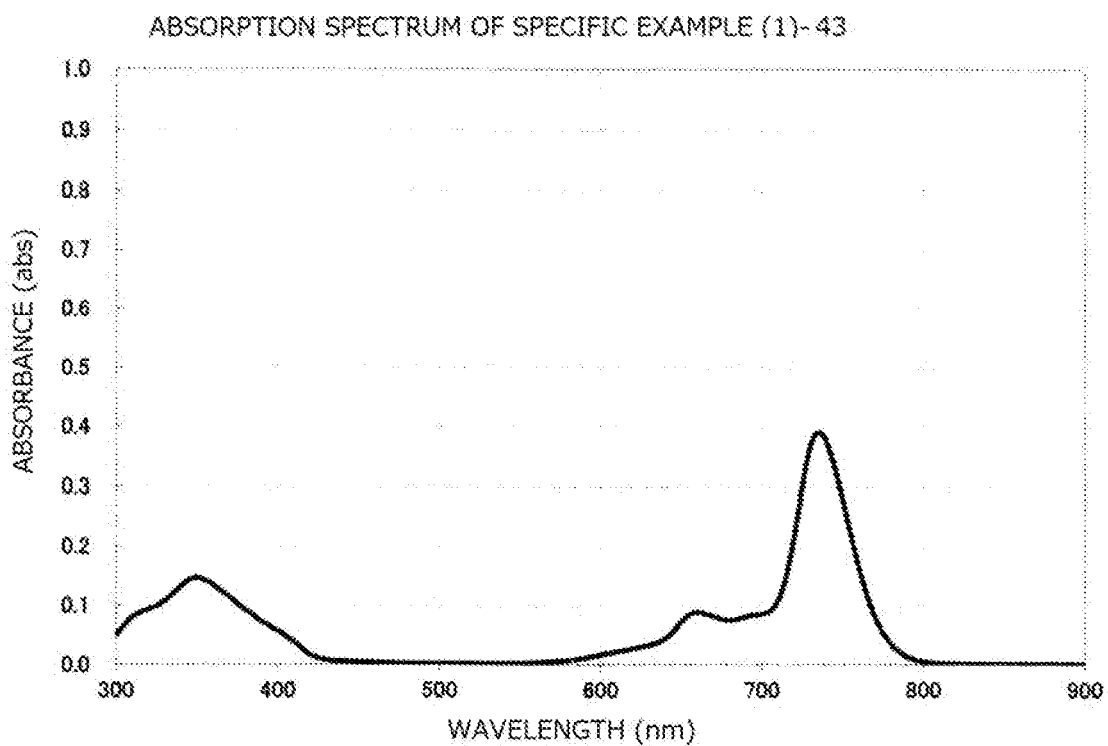
FIG. 6 is an absorption spectrum of a compound (1)-43 produced in Example 6.

Dark green powder (11.2 g) was obtained in the same manner as in Example 1, except that 28.0 g of 4,7-bis(4-(2-fluorophenoxy)butyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 1908M+)
Values of elementary analysis: actual measurement values (C: 70.49%, H: 5.51%, N: 5.85%); theoretical values (C: 70.47%, H: 5.49% N: 5.87%)
A toluene solution of the compound obtained in this way had maximum absorption at 735.5 nm, and the gram absorption coefficient thereof was 7.89×10$^4$ mL/g·cm. The absorption spectrum chart thereof is illustrated in FIG. 6.

[Example 7] Producing of Phthalocyanine-Based Compound (Specific Example (1)-44)

Figure 7:
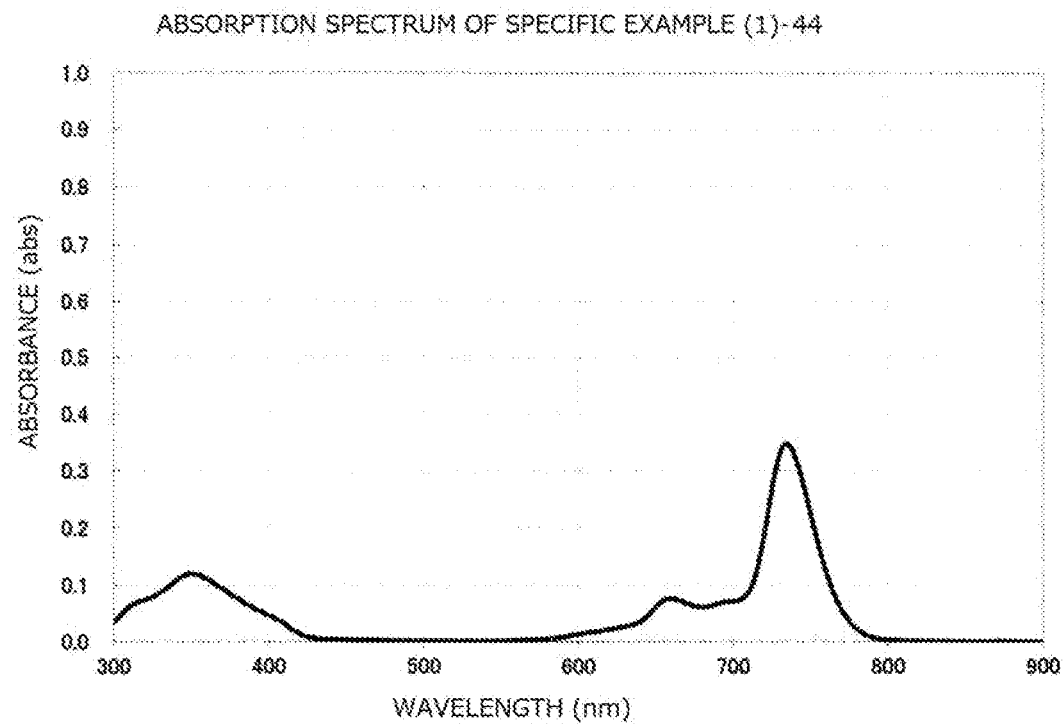
FIG. 7 is an absorption spectrum of a compound (1)-44 produced in Example 7.

Dark green powder (19.7 g) was obtained in the same manner as in Example 1, except that 32.9 g of 4,7-bis(4-(2,6-dimethoxyphenoxy)butyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 2245M+)
Values of elementary analysis: actual measurement values (C: 68.44%, H: 6.44%, N: 4.99%); theoretical values (C: 68.47%, H: 6.46% N: 4.99%)
A toluene solution of the compound obtained in this way had maximum absorption at 734.5 nm, and the gram absorption coefficient thereof was 6.75×10$^4$ mL/g·cm. The absorption spectrum chart thereof is illustrated in FIG. 7.

[Example 8] Producing of Phthalocyanine-Based Compound (Specific Example (1)-38)

Dark green powder (14.9 g) was obtained in the same manner as in Example 1, except that 31.0 g of 4,7-bis(4-(2-phenoxyethoxy)butyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.
MS: (EI)m/z 2117M+)
Values of elementary analysis: actual measurement values (C: 72.62%, H: 6.86%, N: 5.27%); theoretical values (C: 72.60%, H: 6.85% N: 5.29%)

Figure 8:
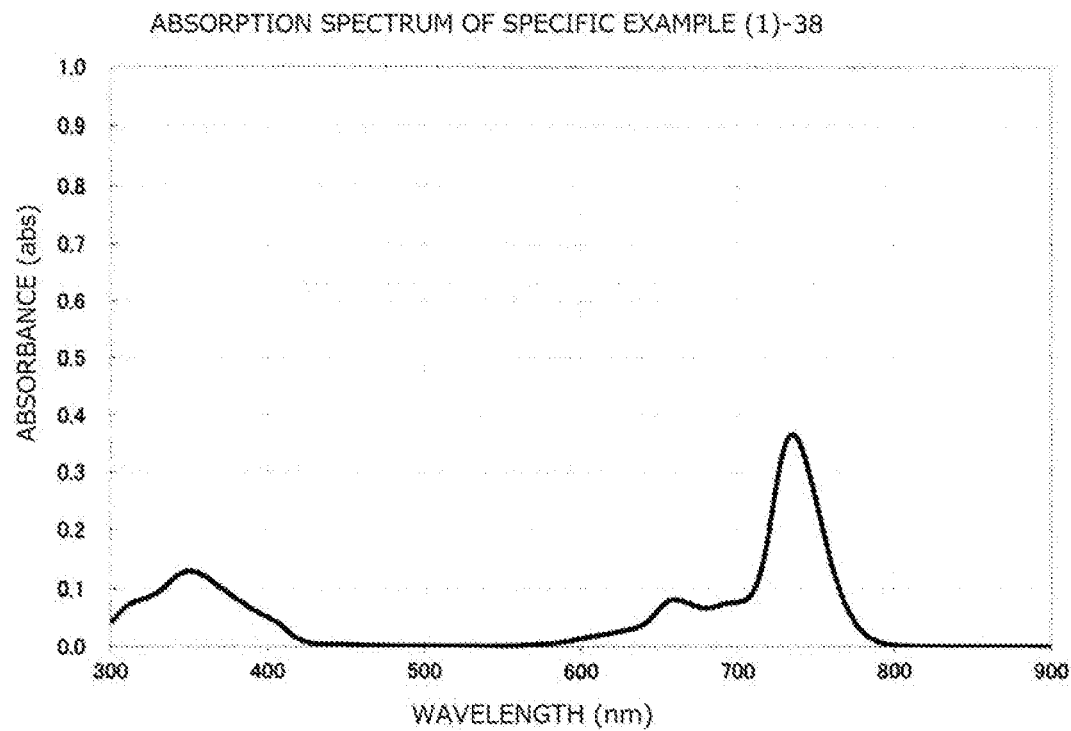
FIG. 8 is an absorption spectrum of a compound (1)-38 produced in Example 8.

A toluene solution of the compound obtained in this way had maximum absorption at 735.0 nm, and the gram absorption coefficient thereof was 7.16×10⁴ mL/g·cm. The absorption spectrum chart thereof is illustrated in FIG. 8.

[Example 9] Producing of Phthalocyanine-Based Compound (Specific Example (1)-31)

Dark green powder (14.9 g) was obtained in the same manner as in Example 1, except that 3.00 g of copper (I) chloride was used instead of 4.76 g of vanadium trichloride in Example 1. From the following analysis results, it was confirmed that the obtained compound is the intended compound.

MS: (EI)m/z 1264M+)

Values of elementary analysis: actual measurement values (C: 76.36%, H: 6.40%, N: 6.34%); theoretical values (C: 76.36%, H: 6.41% N: 6.36%)

Figure 9:
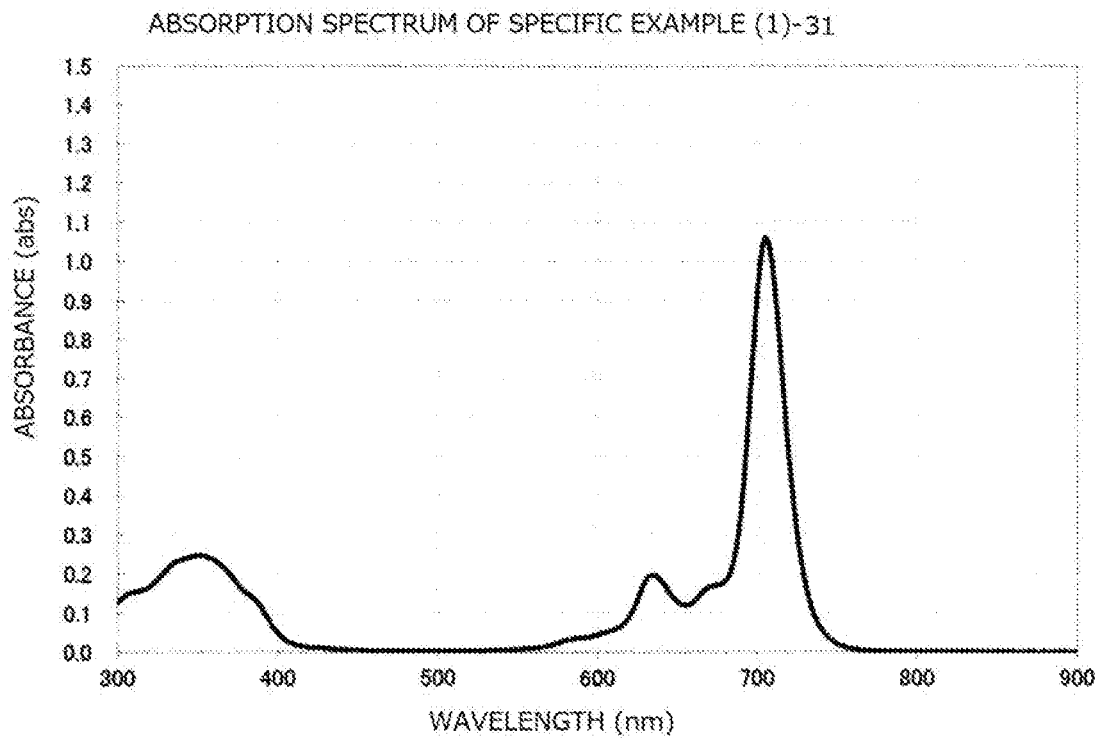
FIG. 9 is an absorption spectrum of a compound (1)-31 produced in Example 9.

A toluene solution of the compound obtained in this way had maximum absorption at 705.5 nm, and the gram absorption coefficient thereof was 7.89×10⁴ mL/g·cm. The absorption spectrum chart thereof is illustrated in FIG. 9.

[Example 10] Producing of Phthalocyanine-Based Compound (Specific Example (1)-40)

Dark green powder (13.5 g) was obtained in the same manner as in Example 1, except that 3.00 g of copper (I) chloride was used instead of 4.76 g of vanadium trichloride in Example 4. From the following analysis results, it was confirmed that the obtained compound is the intended compound.

MS: (EI)m/z 2001M+)

Values of elementary analysis: actual measurement values (C: 72.01%, H: 6.45%, N: 5.61%); theoretical values (C: 72.00%, H: 6.44% N: 5.60%)

Figure 10:
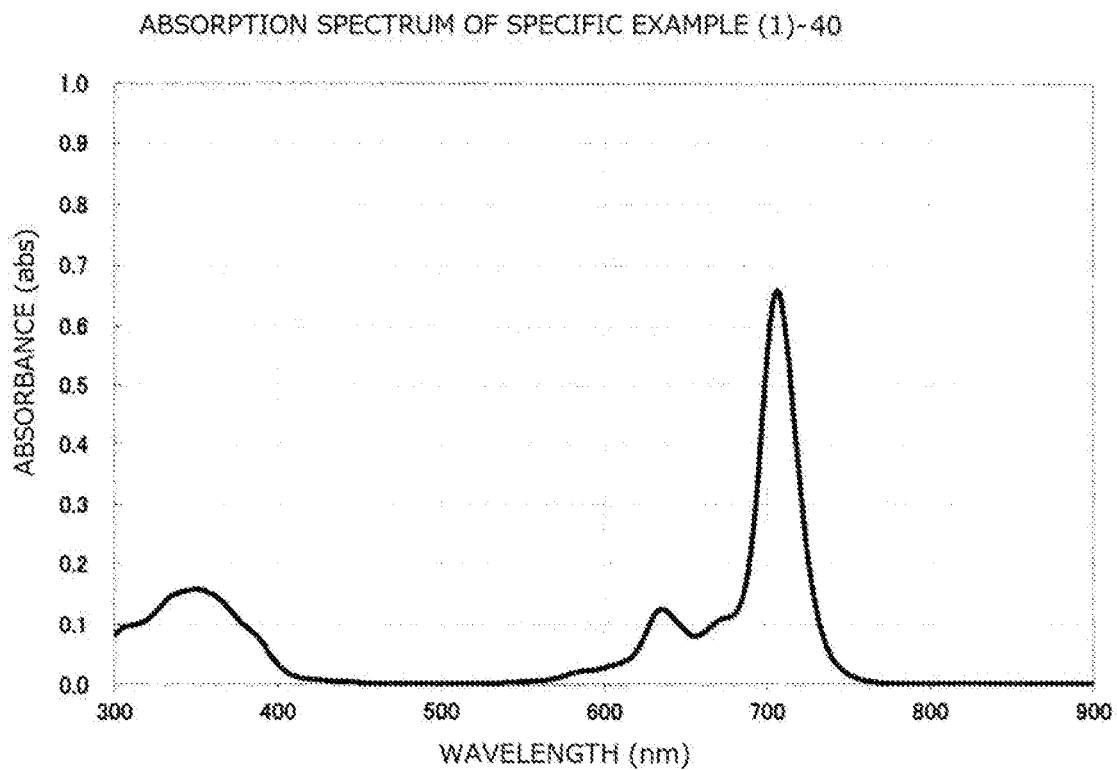
FIG. 10 is an absorption spectrum of a compound (1)-40 produced in Example 10.

A toluene solution of the compound obtained in this way had maximum absorption at 706.5 nm, and the gram absorption coefficient thereof was 6.78×10⁴ mL/g·cm. The absorption spectrum chart thereof is illustrated in FIG. 10.

[Example 11] Producing of Phthalocyanine-Based Compound (Specific Example (1)-45)

Dark green powder (12.1 g) was obtained in the same manner as in Example 1, except that 3.00 g of copper (I) chloride was used instead of 4.76 g of vanadium trichloride in Example 7. From the following analysis results, it was confirmed that the obtained compound is the intended compound.

MS: (EI)m/z 2241M+)

Values of elementary analysis: actual measurement values (C: 68.59%, H: 6.449, N: 5.03%); theoretical values (C: 68.57%, H: 6.47% N: 5.00%)

Figure 11:
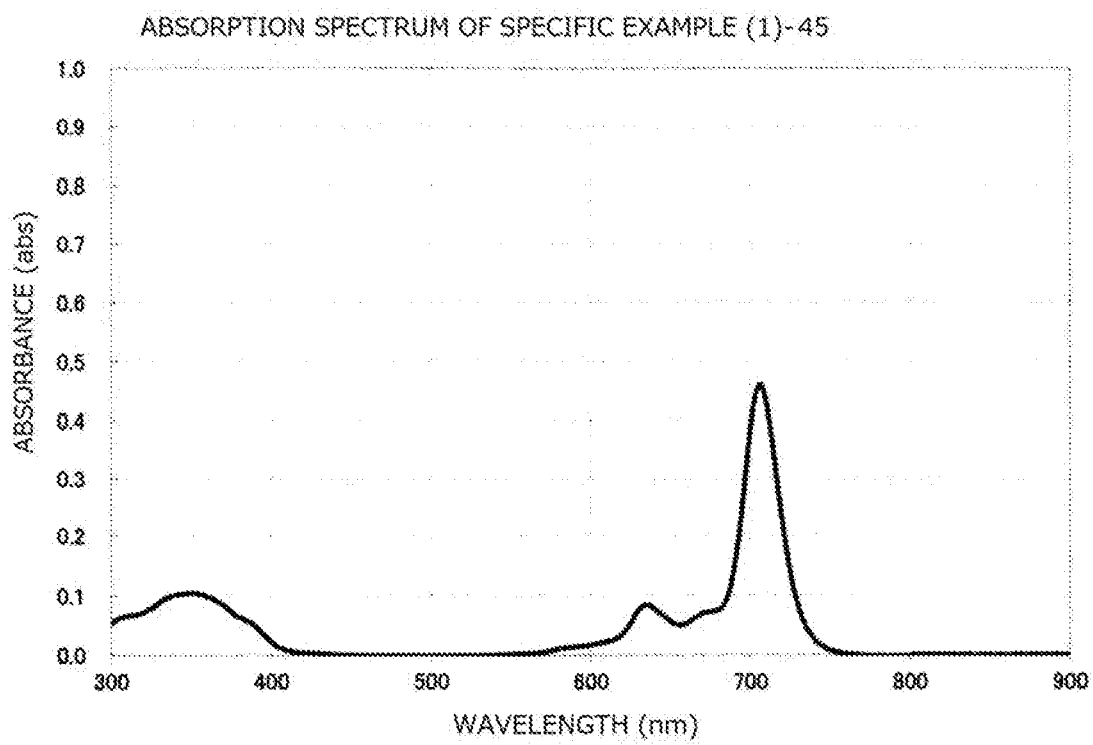
FIG. 11 is an absorption spectrum of a compound (1)-45 produced in Example 11.

A toluene solution of the compound obtained in this way had maximum absorption at 706.5 nm, and the gram absorption coefficient thereof was 6.01×10⁴ mL/g·cm. The absorption spectrum chart thereof is illustrated in FIG. 11.

[Example 12] Producing of Phthalocyanine-Based Compound (Specific Example (1)-32)

Dark green powder (7.4 g) was obtained in the same manner as in Example 1, except that 4.12 g of zinc chloride was used instead of 4.76 g of vanadium trichloride in Example 1. From the following analysis results, it was confirmed that the obtained compound is the intended compound.

MS: (EI)m/z 2003M+)

Values of elementary analysis: actual measurement values (C: 71.95%, H: 6.47%, N: 5.61%); theoretical values (C: 71.93%, H: 6.44% N: 5.59%)

Figure 12:
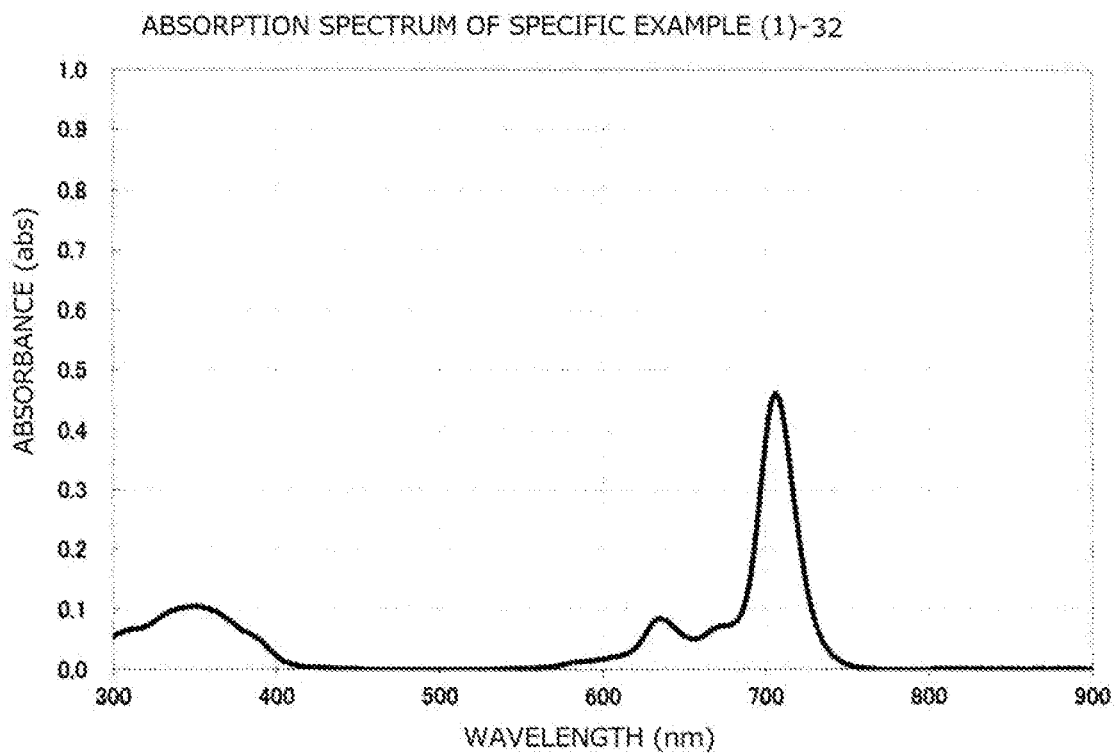
FIG. 12 is an absorption spectrum of a compound (1)-32 produced in Example 12.

A toluene solution of the compound obtained in this way had maximum absorption at 705.0 nm, and the gram absorption coefficient thereof was 7.23×10⁴ mL/g·cm. The absorption spectrum chart thereof is illustrated in FIG. 12.

Comparative Example 1 Synthesis of Comparative Example Compound (a)

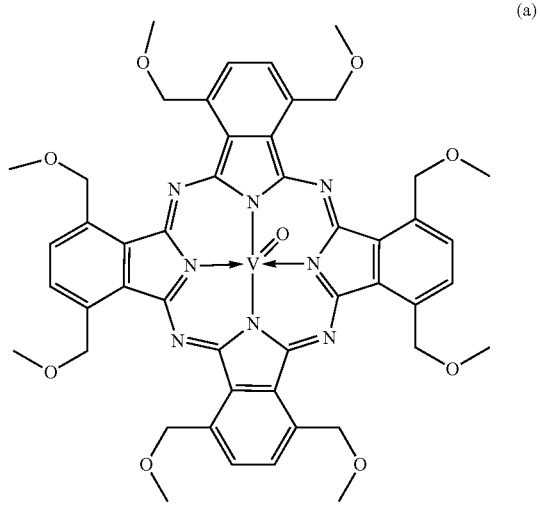

(a)

Dark green powder (9.3 g) was obtained in the same manner as in Example 1, except that 13.7 g of 4,7-bis(4-methoxymethyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.

MS: (EI)m/z 931M+)

Values of elementary analysis: actual measurement values (C: 61.85%, H: 5.16%, N: 11.99%); theoretical values (C: 61.87%, H: 5.19% N: 12.02%)

Figure 13:
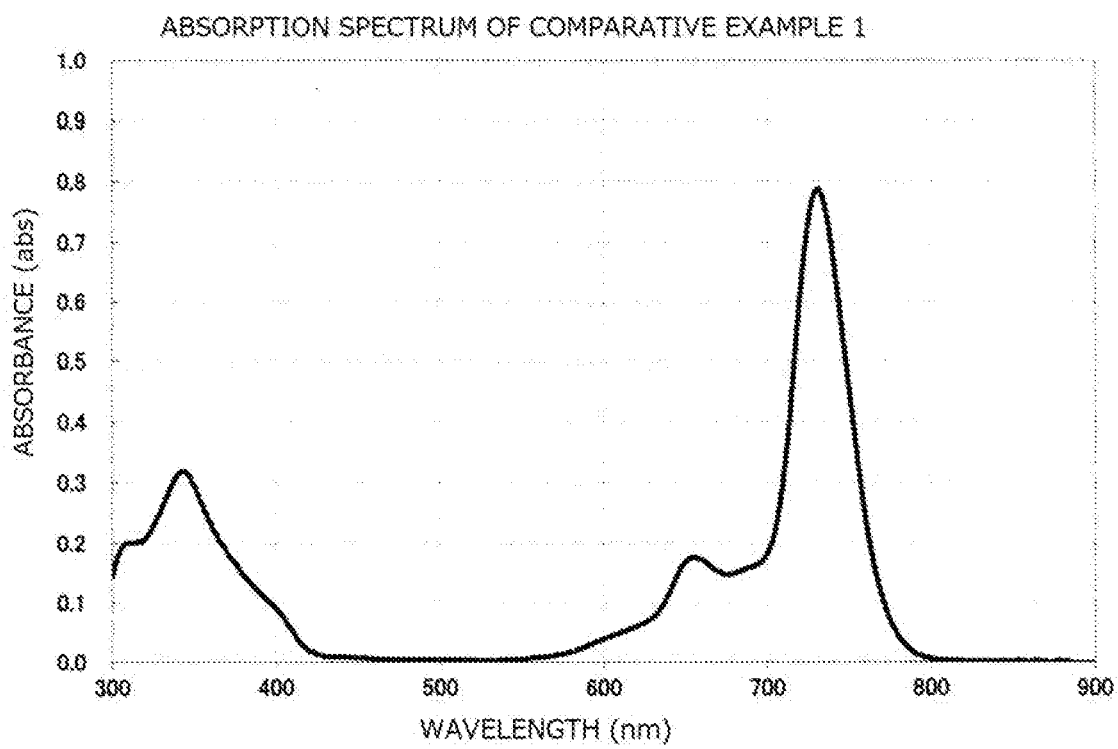
FIG. 13 is an absorption spectrum of a compound produced in Comparative Example 1.

A toluene solution of the compound obtained in this way had maximum absorption at 733.0 nm, and the gram absorption coefficient thereof was 1.30×10⁵ mL/g·cm. The absorption spectrum chart thereof is illustrated in FIG. 13.

Comparative Example 2 Synthesis of Comparative Example Compound (b)

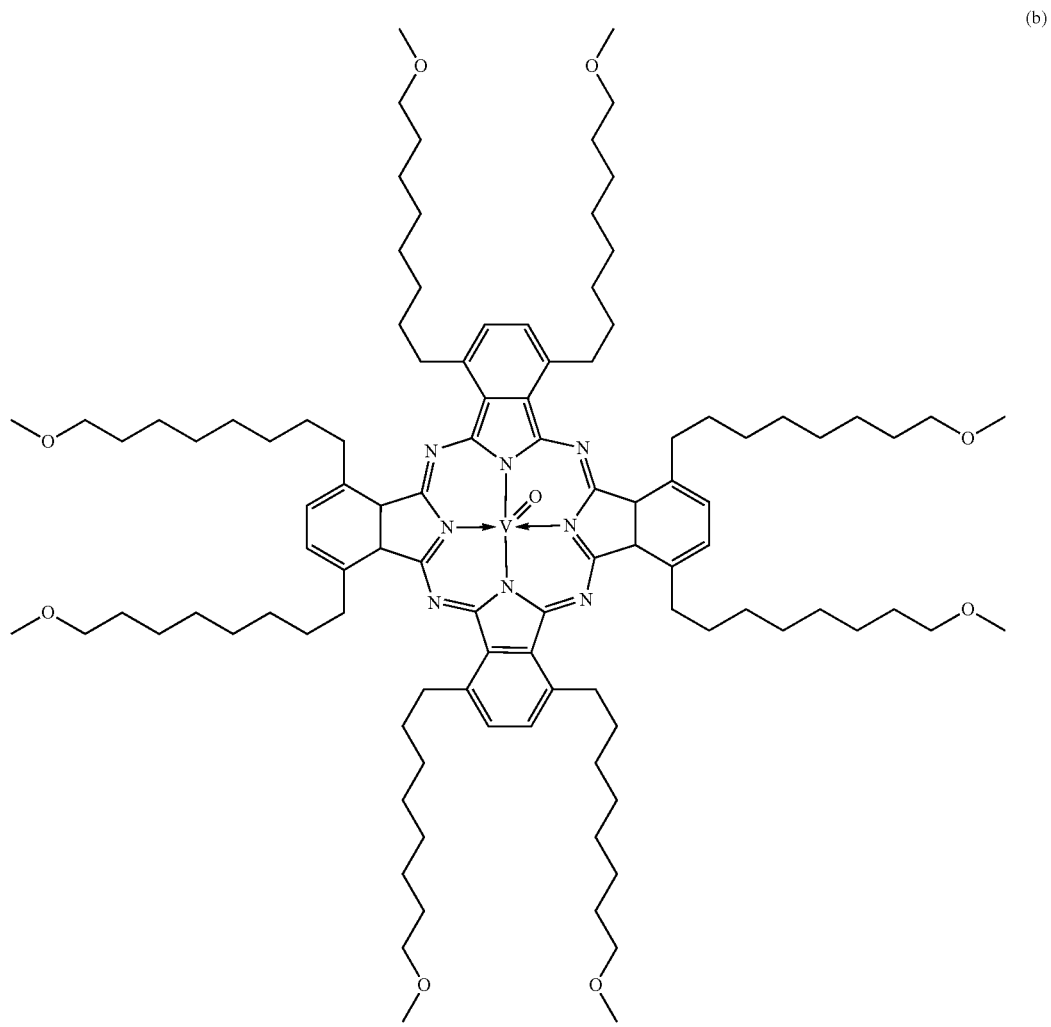

(b)

Dark green powder (15.8 g) was obtained in the same manner as in Example 1, except that 25.2 g of 4,7-bis(4-methoxyoctyl)-1,3-diiminobenzoisoindoline was used instead of 18.6 g of 4,7-bis(4-methoxybutyl)-1,3-diiminobenzoisoindoline in Example 1. From the following analysis results, it was confirmed that the obtained compound is the intended compound.

MS: (EI)m/z 1716M+)

Values of elementary analysis: actual measurement values (C: 72.70%, H: 9.35%, N: 6.55%); theoretical values (C: 72.73%, H: 9.39% N: 6.52%)

Figure 14:
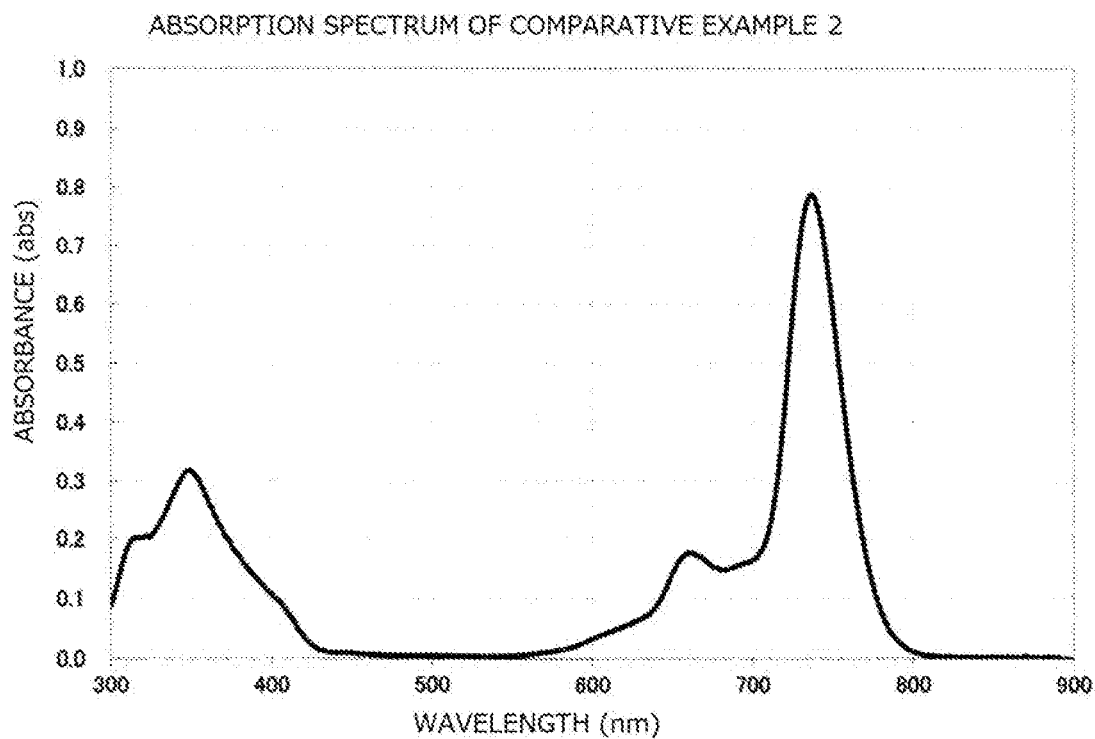
FIG. 14 is an absorption spectrum of a compound produced in Comparative Example 2.

A toluene solution of the compound obtained in this way had maximum absorption at 737.5 nm, and the gram absorption coefficient thereof was $1.05 \times 10^5$ mL/g·cm. The absorption spectrum chart thereof is illustrated in FIG. 14.

[Solubility]

The phthalocyanine compound of the present invention produced in the above examples exhibits high solubility in an aromatic organic solvent (for example, benzene, toluene, xylene, mesitylene, and the like). Furthermore, the phthalocyanine compound also exhibits high solubility in a polar organic solvent (acetone, ethyl acetate, propylene carbonate, cyclopentanone, and the like). The solubility of the phthalocyanine compound with respect to cyclopentanone was measured by the following method. The results are shown in Table 2.

(Method of measuring solubility)

Cyclopentanone was added to about 1 g of the phthalocyanine compound such that the total weight thereof became about 10 g, and the obtained solution was irradiated with ultrasonic waves for about 30 minutes and then stirred for 2 hours at room temperature, thereby preparing a dispersion liquid of about 10 wt %.

The dispersion liquid was filtered through a membrane filter (0.2 μm), the substance obtained by filtration was dried for 1 hour in a drier at 60° C., and then the weight of the substance obtained by filtration was measured.

The solubility of the phthalocyanine compound in a solvent is expressed by the following equation.

Solubility (wt %)=$(W0-W1)/W0$

W0 represents the correct weight of the phthalocyanine not yet being treated, and W1 represents the weight of the substance obtained by filtration (dissolved phthalocyanine compound residue) having been dried. In a case where a substance obtained by filtration did not remain on the filter, the solubility was regarded as being 10 wt % or more.

In cyclopentanone, the compounds of examples exhibit higher solubility compared to the compounds of comparative examples.

TABLE 2

| Example No. | Compound | Solubility to cyclopentanone (wt %) |
|---|---|---|
| Example 1 | Specific Example (1)-30 | ≥10% |
| Example 2 | Specific Example (1)-33 | ≥10% |
| Example 3 | Specific Example (1)-37 | ≥10% |
| Example 4 | Specific Example (1)-39 | ≥10% |
| Example 5 | Specific Example (1)-42 | ≥10% |
| Example 6 | Specific Example (1)-43 | ≥10% |
| Example 7 | Specific Example (1)-44 | ≥10% |
| Example 8 | Specific Example (1)-38 | ≥10% |
| Example 9 | Specific Example (1)-31 | ≥10% |
| Example 10 | Specific Example (1)-40 | ≥10% |
| Example 11 | Specific Example (1)-45 | ≥10% |
| Example 12 | Specific Example (1)-32 | ≥10% |
| Comparative Example 1 | Comparative Example (a) | ≤1% |
| Comparative Example 2 | Comparative Example (b) | ≤1% |

[Visible Light Transmittance]

The visible light transmittance of the phthalocyanine-based compound of the present invention and the comparative example compounds was measured by the following measurement method. The results are shown in Table 3.

Figure 15:
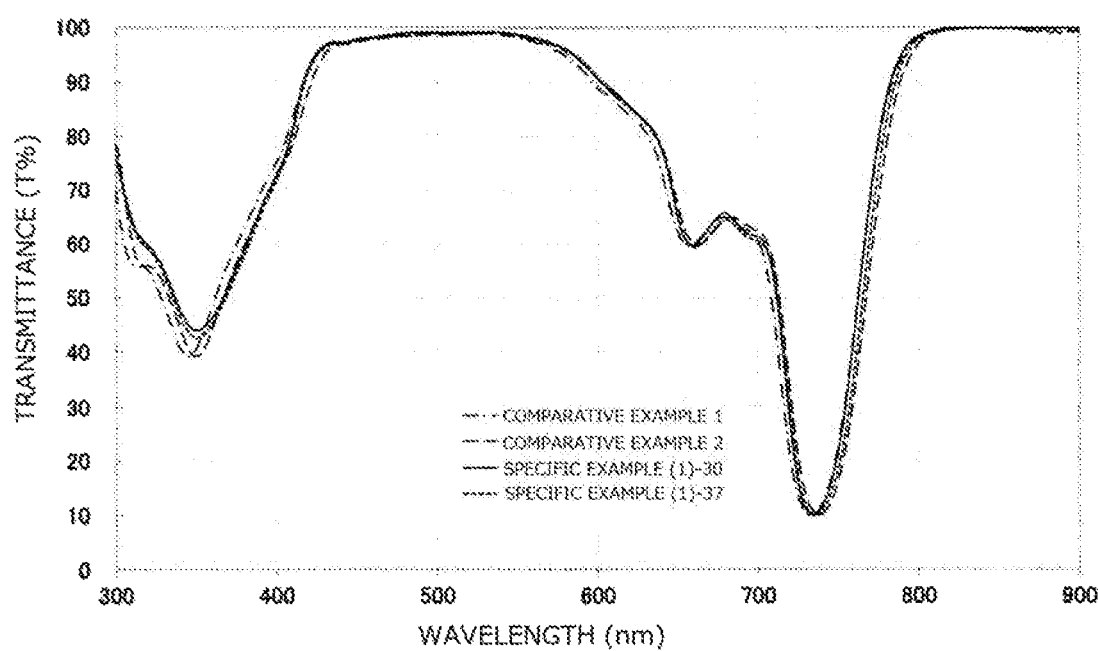
FIG. 15 is a view in which transmission spectra of the compound (1)-30 produced in Example 1, the compound (1)-37 produced in Example 3, and the compounds produced in Comparative Example 1 and Comparative Example 2 are compared with one another.

FIG. 15 is a view in which transmission spectra of the phthalocyanine-based compounds of the present invention produced in Example 1 and Example 3 and the compounds produced in Comparative Example 1 and Comparative Example 2 are compared with one another.

(Method of measuring visible light transmittance)

Each of the phthalocyanine compounds (1,000 mg) and approximately 90 mL of chloroform were put into a 100 mL volumetric flask, and the solution in the flask was irradiated with ultrasonic waves for 30 minutes and left to stand for 2 hours at room temperature. Then, chloroform was added thereto such that the meniscus of the solution matched up with the calibration mark on the volumetric flask, thereby preparing a 10 mg/L phthalocyanine solution. The prepared solution was put into a 1 cm×1 cm cell made of PYREX (registered trademark), and the absorption spectrum thereof was measured using a spectrophotometer (produced by Hitachi, Ltd.: Spectrophotometer U-3500).

The absorption spectrum measured as above was converted such that the absorbance became 1.0, that is, the transmittance became 10% at the maximum absorption wavelength in a near-infrared range, thereby obtaining a transmission spectrum. Table 3 shows the transmittance at 460 nm and 610 nm in the transmission spectrum. At 460 nm, the transmittance of the compound of the present invention was approximately the same as the transmittance of Comparative Examples 1 and 2. However, at 610 nm, the transmittance of the compound of the present invention was greatly improved.

TABLE 3

| | Transmittance (%) | |
|---|---|---|
| Compound | 460 nm | 610 nm |
| Example 1 (Specific Example (1)-30) | 98.1 | 88.4 |
| Example 2 (Specific Example (1)-33) | 98.1 | 88.3 |
| Example 3 (Specific Example (1)-37) | 98.0 | 88.1 |
| Example 4 (Specific Example (1)-39) | 97.7 | 88.1 |
| Example 5 (Specific Example (1)-42) | 97.9 | 88.5 |
| Example 6 (Specific Example (1)-43) | 97.6 | 88.0 |
| Example 7 (Specific Example (1)-44) | 98.3 | 89.0 |
| Example 8 (Specific Example (1)-38) | 98.3 | 88.6 |
| Example 9 (Specific Example (1)-31) | 99.2 | 88.3 |
| Example 10 (Specific Example (1)-40) | 99.4 | 88.0 |
| Example 11 (Specific Example (1)-45) | 99.9 | 89.5 |
| Example 12 (Specific Example (1)-32) | 99.9 | 88.8 |
| Comparative Example 1 (a) | 97.9 | 86.6 |
| Comparative Example 2 (b) | 97.8 | 87.9 |

[Example 13] Producing of Heat Ray Shielding Film

The phthalocyanine compound (Specific Example (1)-30) produced in Example 1 (5 g), 50 g of an acryl resin LP-45M (trade name, produced by Soken Chemical & Engineering Co., Ltd.), 20 g of methyl ethyl ketone, and 20 g of toluene were mixed and stirred together, thereby producing a resin composition.

As a transparent substrate, a polyethylene terephthalate film (PET film) having a thickness of 100 μm was bar-coated with the resin composition such that the thickness thereof became 2.5 μm, and then the applied resin composition was dried for 3 minutes at 100° C. Furthermore, the other surface of the PET film (surface not being coated with the resin composition) was bar-coated with a transparent acryl copolymer-based pressure sensitive adhesive such that the thickness thereof became 20 μm, and the applied pressure sensitive adhesive was dried and cured for 3 minutes at 100° C. Thereafter, a release film was bonded to the surface of the pressure sensitive adhesive, thereby producing a heat ray shielding film.

[Example 14] Producing of Heat Ray Shielding Film

A heat ray shielding film was produced by performing the same operation as in Example 13, except that the compound of Specific Example (1)-33 was used as a phthalocyanine-based compound instead of the compound of Specific Example (1)-30 in Example 13.

[Example 15] Producing of Heat Ray Shielding Film

A heat ray shielding film was produced by performing the same operation as in Example 13, except that the compound of Specific Example (1)-37 was used as a phthalocyanine-based compound instead of the compound of Specific Example (1)-30 in Example 13.

[Example 16] Producing of Heat Ray Shielding Film

A heat ray shielding film was produced by performing the same operation as in Example 13, except that the compound of Specific Example (1)-39 was used as a phthalocyanine-based compound instead of the compound of Specific Example (1)-30 in Example 13.

[Example 17] Producing of Heat Ray Shielding Film

A heat ray shielding film was produced by performing the same operation as in Example 13, except that the compound of Specific Example (1)-42 was used as a phthalocyanine-based compound instead of the compound of Specific Example (1)-30 in Example 13.

[Example 18] Producing of Heat Ray Shielding Film

A heat ray shielding film was produced by performing the same operation as in Example 13, except that, the compound of Specific Example (1)-43 was used as a phthalocyanine-based compound instead of the compound of Specific Example (1)-30 in Example 13.

[Example 19] Producing of Heat Ray Shielding Film

A heat ray shielding film was produced by performing the same operation as in Example 13, except that the compound of Specific Example (1)-44 was used as a phthalocyanine-based compound instead of the compound of Specific Example (1)-30 in Example 13.

[Example 20] Producing of Heat Ray Shielding Film

A heat ray shielding film was produced by performing the same operation as in Example 13, except that the compound of Specific Example (1)-38 was used as a phthalocyanine-based compound instead of the compound of Specific Example (1)-30 in Example 13.

[Example 21] Producing of Heat Ray Shielding Film

A heat ray shielding film was produced by performing the same operation as in Example 13, except that the compound of Specific Example (1)-31 was used as a phthalocyanine-based compound instead of the compound of Specific Example (1)-30 in Example 13.

[Example 22] Producing of Heat Ray Shielding Film

A heat ray shielding film was produced by performing the same operation as in Example 13, except that the compound of Specific Example (1)-40 was used as a phthalocyanine-based compound instead of the compound of Specific Example (1)-30 in Example 13.

[Example 23] Producing of Heat Ray Shielding Film

A heat ray shielding film was produced by performing the same operation as in Example 13, except that the compound of Specific Example (1)-45 was used as a phthalocyanine-based compound instead of the compound of Specific Example (1)-30 in Example 13.

[Example 24] Producing of Heat Ray Shielding Film

A heat ray shielding film was produced by performing the same operation as in Example 13, except that the compound of Specific Example (1)-32 was used as a phthalocyanine-based compound instead of the compound of Specific Example (1)-30 in Example 13.

[Comparative Example 3] Producing of Heat Ray Shielding Film

A heat ray shielding film was produced by performing the same operation as in Example 13, except that, the compound (a) of Comparative Example 1 was used as a phthalocyanine-based compound instead of the compound of Specific Example (1)-30 in Example 13. The heat ray shielding films of Examples 13 to 24 and Comparative Example 3 were evaluated in terms of the following items. The results are shown in the following Table 4.

In the evaluation test, the release film was peeled from the produced heat ray shielding film, then the heat ray shielding film was compressed on a 5 cm×5 cm×3 mm (thickness) glass plate, and a test piece created in this way was used.

[Tts]

By using U-3500 type recording spectrophotometer produced by Hitachi, Ltd. as a measurement instrument, Tts of the laminated glass sample was measured based on JIS R3106 "Testing method for transmittance, reflectance, emissivity, and solar heat gain coefficient of flat glasses".

Tts (Total solar energy transmitted through a glazing) represents a total solar transmittance. The smaller the Tts shows the higher the heat shielding ability.

[Light Fastness•Heat Resistance]

For a light fastness test, the absorption spectrum of the test piece was measured using a spectrophotometer (produced by Hitachi, Ltd.: Spectrophotometer U-3500) and adopted as a spectrum before light fastness test. Then, the test piece used for measuring the spectrum before test was irradiated with light for 200 hours at 550 W/h by using a xenon light fastness tester (produced by Toyo Seiki Seisaku-sho, Ltd.: SUNTEST XLS+). The absorption spectrum of the test piece irradiated with light was measured using the spectrophotometer and adopted as a spectrum after light fastness test.

For a heat resistance test, the test piece used for measuring the spectrum before test as described above was treated with heat for 200 hours at a temperature of 100° C. in a thermostat (produced by Yamato Scientific co., ltd.: IG400). By using the spectrophotometer, the absorption spectrum of the heat-treated test piece was measured and adopted as a spectrum after heat resistance test.

In each of the spectra measured as above before and after the light fastness•heat resistance test, the values of absorbance within a range of 400 to 900 nm were integrated, and a difference between the integrated value before the light fastness•heat resistance test and the integrated value after the light fastness•heat resistance test was calculated.

The difference ΔE between the absorbance before the light fastness•heat resistance test and the absorbance after the light fastness•heat resistance test is expressed by the following equation.

$$\Delta E\ (\%) = \{\Sigma E(400 \text{ to } 900 \text{ nm in } E1) - \Sigma E(400 \text{ to } 900 \text{ nm in } E2)\}/\Sigma E(400 \text{ to } 900 \text{ nm in } E1) \times 100$$

E1 represents the spectrum before test, E2 represents the spectrum after test, and Σ represents integration of the values of absorbance.

The larger the value of ΔE, the greater the spectrum change between before and after the light fastness•heat resistance test.

As shown in Table 8, all of the heat ray shielding films of examples exhibited better characteristics such as a heat shielding ability, light fastness, and heat resistance compared to the comparative example. Particularly, light fastness and heat resistance thereof were extremely excellent.

TABLE 4

| Example No. | Compound | Tts | ΔE (%) Light fastness | ΔE (%) Heat resistance |
|---|---|---|---|---|
| Example 13 | Specific Example (1)-30 | 86.1 | 5 | 6 |
| Example 14 | Specific Example (1)-33 | 85.8 | 3 | 2 |
| Example 15 | Specific Example (1)-37 | 85.5 | 5 | 3 |
| Example 16 | Specific Example (1)-39 | 85.9 | 4 | 3 |
| Example 17 | Specific Example (1)-42 | 86.0 | 4 | 4 |
| Example 18 | Specific Example (1)-43 | 85.7 | 2 | 3 |
| Example 19 | Specific Example (1)-44 | 85.6 | 3 | 4 |
| Example 20 | Specific Example (1)-38 | 85.8 | 5 | 3 |
| Example 21 | Specific Example (1)-31 | 86.0 | 3 | 3 |
| Example 22 | Specific Example (1)-40 | 85.9 | 2 | 3 |
| Example 23 | Specific Example (1)-45 | 85.5 | 2 | 3 |
| Example 24 | Specific Example (1)-32 | 85.6 | 10 | 12 |
| Comparative Example 3 | Comparative example compound (a) | 89.5 | 33 | 31 |

[Example 25] Preparation of Interlayer for Laminated Glass and Laminated Glass

<Preparation of Interlayer for Laminated Glass>

The phthalocyanine-based compound (Specific Example (1)-30) produced in Example 1 (0.013 g) was dissolved in 40 g of triethylene glycol-di-2-ethylhexanoate as an organic ester plasticizer. The obtained solution was added to 100 g of a polyvinyl butyral resin (trade name: BH-3, produced by SEKISUI CHEMICAL CO., LTD.), thoroughly melted and kneaded using a mixing roll, and extruded using an extruder, thereby obtaining an interlayer having a thickness of 0.76 mm.

<Preparation of Laminated Glass>

The interlayer was cut in size of 100 mm×100 mm, interposed between heat ray absorbing glass plates (100 mm (length)×100 mm (width)×2.0 mm (thickness)) prepared based on JIS R3208, put into a rubber bag, and deaerated for 20 minutes at a degree of vacuum of 2.6 kPa. Then, the deaerated laminate was moved into an oven and further hold for 30 minutes at 90° C. to vacuum press. Thereafter, the laminate was compressed for 20 minutes in an autoclave under the condition of a temperature of 130° C. and a pressure of 1.3 MPa, thereby obtaining a laminated glass sample.

[Example 26] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-33) produced in Example 2.

[Example 27] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-37) produced in Example 3.

[Example 28] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-39) produced in Example 4.

[Example 29] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-42) produced in Example 5.

[Example 30] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-43) produced in Example 6.

[Example 31] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-44) produced in Example 7.

[Example 32] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-38) produced in Example 8.

[Example 33] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-31) produced in Example 9.

[Example 34] Preparation of Interlayer for Laminated Glass and Laminated Glass

An interlayer for laminated glass and laminated glass were prepared by performing the same operation as in Example 25, except that the phthalocyanine-based compound in Example 25 was changed to the compound (Specific Example (1)-40) produced in Example 10.

[Example 35] Preparation of Interlayer for Laminated Glass and Laminated Glass An interlayer for laminated glass and laminated glass were prepared by performing the same operation as in Example 25, except that the phthalocyanine-based compound in Example 25 was changed to the compound (Specific Example (1)-45) produced in Example 11.

[Example 36] Preparation of Interlayer for Laminated Glass and Laminated Glass An interlayer for laminated glass and laminated glass were prepared by performing the same operation as in Example 25, except that the phthalocyanine-based compound in Example 25 was changed to the compound (Specific Example (1)-32) produced in Example 12.

[Comparative Example 4] Preparation of Interlayer for Laminated Glass and Laminated Glass An interlayer for laminated glass and laminated glass were prepared by performing the same operation as in Example 25, except that the compound (a) of Comparative Example 1 was used as the phthalocyanine-based compound instead of the compound of Specific Example (1)-30 in Example 25.

The laminated glass samples of Examples 25 to 36 and Comparative Example 4 were evaluated in terms of the following items. The results are shown in the following Table 5.

[TtS]

By using U-3500 type recording spectrophotometer produced by Hitachi, Ltd. as a measurement instrument, Tts of the laminated glass samples was measured based on JIS R3106 "Testing method for transmittance, reflectance, emissivity, and solar heat gain coefficient of flat glasses".

[Visible Light Transmittance]

By using U-3500 type recording spectrophotometer produced by Hitachi, Ltd. as a measurement instrument, the visible light transmittance of the laminated glass samples at a wavelength of 380 to 780 nm was measured based on JIS R3212 "Test methods of safety glazing materials for road vehicles".

[Light Fastness•Heat Resistance]

For a light fastness test, the absorption spectrum of the laminated glass was measured using a spectrophotometer (produced by Hitachi, Ltd.: Spectrophotometer U-3500) and adopted as a spectrum before light fastness test. Then, the laminated glass used for measuring the spectrum before test was irradiated with light for 200 hours at 550 W/h by using a xenon light fastness tester (produced by Toyo Seiki Seisaku-sho, Ltd.: SUNTEST XLS+). The absorption spectrum of the laminated glass irradiated with light was measured using the spectrophotometer and adopted as a spectrum after light fastness test.

For a heat resistance test, the laminated glass used for measuring the spectrum before test as described above was treated with heat for 200 hours at a temperature of 100° C. in a thermostat (produced by Yamato Scientific co., ltd.: IG400). By using the spectrophotometer, the absorption spectrum of the heat-treated laminated glass was measured and adopted as a spectrum after heat resistance test.

In each of the spectra measured as above before and after the light fastness•heat resistance test, the values of absorbance within a range of 400 to 900 nm were integrated, and a difference between the integrated value before the light fastness•heat resistance test and the integrated value after the light fastness•heat resistance test was calculated.

The difference $\Delta E$ between the absorbance before the light fastness•heat resistance test and the absorbance after the light fastness•heat resistance test is expressed by the following equation.

$$\Delta E (\%) = \{E(400 \text{ to } 900 \text{ nm in } E1) - E(400 \text{ to } 900 \text{ nm in } E2)\}/E(400 \text{ to } 900 \text{ nm in } E1) \times 100$$

E1 represents the spectrum before test, E2 represents the spectrum after test, and $\Sigma$ represents integration of values of absorbance. The larger the value of $\Delta E$, the greater the spectrum change between before and after the light fastness•heat resistance test.

As shown in Table 5, all of the laminated glass of examples 25 to 36, in which the phthalocyanine compound of the present invention was used, exhibited better characteristics such as a heat shielding ability, a visible light transmittance, light fastness, and heat resistance compared to comparative example 4. Particularly, the laminated glass of examples 25 to 36 was excellent in light fastness and heat resistance.

TABLE 5

| Example No. | Compound | Tts | Visible light transmittance | ΔE (%) Light fastness | ΔE (%) Heat resistance |
|---|---|---|---|---|---|
| Example 25 | Specific Example (1)-30 | 53.2 | 78.1 | 5 | 6 |
| Example 26 | Specific Example (1)-33 | 51.5 | 77.5 | 2 | 3 |
| Example 27 | Specific Example (1)-37 | 52.6 | 77.9 | 3 | 3 |
| Example 28 | Specific Example (1)-39 | 52.7 | 78.0 | 4 | 3 |
| Example 29 | Specific Example (1)-42 | 52.3 | 77.7 | 2 | 3 |
| Example 30 | Specific Example (1)-43 | 52.0 | 77.6 | 3 | 4 |
| Example 31 | Specific Example (1)-44 | 52.9 | 77.9 | 3 | 3 |
| Example 32 | Specific Example (1)-38 | 51.7 | 77.8 | 4 | 2 |
| Example 33 | Specific Example (1)-31 | 51.5 | 77.7 | 3 | 2 |
| Example 34 | Specific Example (1)-40 | 52.0 | 77.9 | 2 | 2 |
| Example 35 | Specific Example (1)-45 | 52.5 | 77.4 | 3 | 4 |
| Example 36 | Specific Example (1)-32 | 53.5 | 77.6 | 10 | 14 |
| Comparative Example 4 | Comparative example compound (a) | 53.6 | 75.0 | 33 | 35 |

INDUSTRIAL APPLICABILITY

The phthalocyanine-based compound of the present invention has strong absorption in a near-infrared range and extremely weak absorption in a visible range, exhibits excellent solubility in an organic solvent or a resin, and has extremely high durability such as light fastness and heat resistance.

Accordingly, the phthalocyanine-based compound of the present invention is extremely useful as a near-infrared absorbing colorant for uses such as a near-infrared cut-off filter, a transparent ink used for security, a heat ray shielding film used in windows of automobiles or buildings, an interlayer for laminated glass, and an infrared thermosensitive recording material, and laser welding of plastics.

The invention claimed is:

1. A phthalocyanine-based compound represented by General Formula (1),

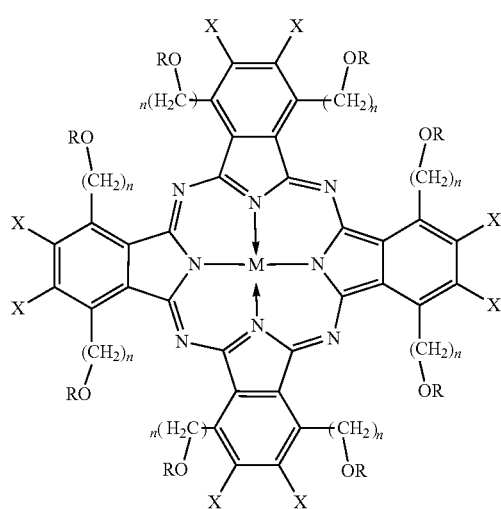

(1)

wherein, in Formula (1), R represents an alkyl group or an aryl group, X represents a hydrogen atom, a halogen atom, or an alkyl group, X's can form an aromatic ring by being bonded to each other, M represents two hydrogen atoms, a divalent metal, or a trivalent or tetravalent metal derivative, and n represents an integer of 3 to 6.

2. The phthalocyanine-based compound according to claim 1,
wherein R represents a branched or linear alkyl group having 1 to 12 carbon atoms.

3. The phthalocyanine-based compound according to claim 1,
wherein M represents two hydrogen atoms, Pd, Cu, Zn, Pt, Ni, TiO, Co, Fe, Mn, Sn, Cl, VO, or In.

4. The phthalocyanine-based compound according to claim 3,
wherein R represents a methyl group or an ethyl group, X represents a hydrogen atom, and n represents an integer of 3 to 6.

5. The phthalocyanine-based compound according to claim 4,
wherein n represents 4.

6. The phthalocyanine-based compound according to claim 1,
wherein R represents a methyl group or an ethyl group, X represents a hydrogen atom, and n represents an integer of 3 to 6.

7. The phthalocyanine-based compound according to claim 6,
wherein n represents 4.

8. A near-infrared absorbing material comprising:
at least one kind of the phthalocyanine-based compound according to claim 1.

9. A heat ray shielding material comprising:
at least one kind of the phthalocyanine-based compound according to claim 1.

10. The heat ray shielding material according to claim 9 that is a heat ray shielding film.

11. The heat ray shielding material according to claim 9 that is an interlayer for laminated glass.

12. A phthalocyanine-based compound represented by General Formula (1),

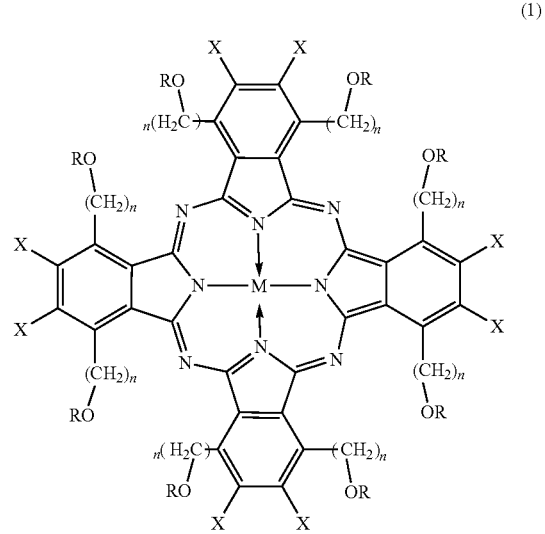

(1)

wherein, in Formula (1), R represents an alkyl group or an aryl group, X represents a hydrogen atom, a halogen atom, or an alkyl group, X's can form an aromatic ring by being bonded to each other, M represents two hydrogen atoms, a divalent metal, or a trivalent or tetravalent metal derivative, and n represents all integer of 3 to 6;
wherein the phthalocyanine-based compound has equal or greater than 10 wt % solubility in cyclopentanone and has a transmittance of 97.6% or more at 460 nm and 88.0% or more at 610 nm.

* * * * *